United States Patent
Pottle et al.

(10) Patent No.: US 12,292,515 B2
(45) Date of Patent: May 6, 2025

(54) GENERATING AND DISTRIBUTING GNSS RISK ANALYSIS DATA FOR FACILITATING SAFE ROUTING OF AUTONOMOUS DRONES

(71) Applicant: Spirent Communications PLC, Crawley (GB)

(72) Inventors: Matthew Pottle, Paignton (GB); Esther Anyaegbu, Northampton (GB); Colin Richard Ford, Carmarthen (GB); Paul Hansen, Cambridge (GB); Ronald Toh Ming Wong, Paignton (GB); Jeremy Charles Bennington, Greenwood, IN (US); Samuel Nardoni, Paignton (GB)

(73) Assignee: Spirent Communications PLC, Crawley (GB)

( * ) Notice: Subject to any disclaimer, the term of this patent is extended or adjusted under 35 U.S.C. 154(b) by 414 days.

(21) Appl. No.: 17/948,218

(22) Filed: Sep. 19, 2022

(65) Prior Publication Data

US 2023/0016836 A1    Jan. 19, 2023

Related U.S. Application Data

(63) Continuation-in-part of application No. 17/706,421, filed on Mar. 28, 2022, now Pat. No. 11,802,972, (Continued)

(51) Int. Cl.
*G01S 19/08* (2010.01)
*H04L 67/12* (2022.01)
*G08G 1/0968* (2006.01)

(52) U.S. Cl.
CPC .............. *G01S 19/08* (2013.01); *H04L 67/12* (2013.01); *G08G 1/0968* (2013.01)

(58) Field of Classification Search
CPC ................... G01S 19/08; H04L 67/12
(Continued)

(56) References Cited

U.S. PATENT DOCUMENTS

| 4,284,160 A | 8/1981 | DeLiban et al. |
| 5,548,814 A | 8/1996 | Lorang et al. |

(Continued)

FOREIGN PATENT DOCUMENTS

| CN | 101776766 A | 7/2010 |
| CN | 106131101 A | 11/2016 |

(Continued)

OTHER PUBLICATIONS

U.S. Appl. No. 13/786,020, filed Mar. 5, 2013, U.S. Pat. No. 9,519,063, Dec. 13, 2016, Granted.
(Continued)

*Primary Examiner* — Harry K Liu
(74) *Attorney, Agent, or Firm* — Haynes Beffel & Wolfeld LLP; Ernest J Beffel, Jr.

(57) ABSTRACT

Disclosed is route planning using a worst-case risk analysis and, if needed, a best-case risk analysis of GNSS coverage. The worst-case risk analysis identifies cuboids or 2d regions through which a vehicle can be routed with assurance that adequate GNSS coverage will be available regardless of the time of day that the vehicle travels. The best-case risk analysis identifies cuboids or 2d regions through which there is adequate coverage at some times during the day. In case path finding using the worst-case risk analysis fails, a best-case risk analysis can be requested and used to find alternate potential path(s). Time dependent forecast data that covers regions along the alternate potential path(s) can be requested and used to route vehicles, including autonomous drones, from starting points to destinations. This includes generation, distribution and use of risk analysis data, implemented as methods, systems and articles of manufacture.

24 Claims, 18 Drawing Sheets

Related U.S. Application Data which is a continuation of application No. 17/374,885, filed on Jul. 13, 2021, now Pat. No. 11,287,531.

(60) Provisional application No. 63/407,579, filed on Sep. 16, 2022, provisional application No. 63/161,386, filed on Mar. 15, 2021, provisional application No. 63/051,849, filed on Jul. 14, 2020.

(58) Field of Classification Search
USPC .................................................. 342/357.45
See application file for complete search history.

(56) References Cited

U.S. PATENT DOCUMENTS

| | | |
|---|---|---|
| 5,761,486 A | 6/1998 | Watanabe et al. |
| 6,191,708 B1 | 2/2001 | Davidson |
| 6,208,841 B1 | 3/2001 | Wallace et al. |
| 6,396,825 B1 | 5/2002 | Jasper et al. |
| 6,560,459 B1 | 5/2003 | Wong |
| 6,571,082 B1 | 5/2003 | Rahman et al. |
| 6,636,721 B2 | 10/2003 | Threadgill et al. |
| 7,224,941 B2 | 5/2007 | Liu |
| 7,324,588 B2 | 1/2008 | Green et al. |
| 7,349,670 B2 | 3/2008 | Mlinarsky et al. |
| 7,395,060 B2 | 7/2008 | Liu |
| 7,398,056 B1 | 7/2008 | Ebert et al. |
| 7,508,868 B2 | 3/2009 | Chang |
| 7,539,489 B1 | 5/2009 | Alexander |
| 7,555,420 B2 | 6/2009 | Wang et al. |
| 7,606,165 B2 | 10/2009 | Qiu et al. |
| 7,646,338 B2 | 1/2010 | Monnerat |
| 7,693,082 B2 | 4/2010 | Wright |
| 7,809,404 B2 | 10/2010 | Daniels et al. |
| 8,150,675 B1 | 4/2012 | Ortmanns et al. |
| 8,213,957 B2 | 7/2012 | Bull et al. |
| 8,223,068 B2 | 7/2012 | Allan et al. |
| 8,364,090 B2 | 1/2013 | Ramasamy et al. |
| 9,008,964 B2 | 4/2015 | Mansour |
| 9,519,063 B2 | 12/2016 | Davis et al. |
| 9,945,956 B2 | 4/2018 | Chhokra et al. |
| 11,131,774 B2 | 9/2021 | Miya et al. |
| 11,150,353 B2 | 10/2021 | Nishi et al. |
| 12,072,425 B2 * | 8/2024 | Knoedler ................ G01S 19/40 |
| 2001/0004380 A1 | 6/2001 | Mannermaa |
| 2001/0033627 A1 | 10/2001 | Syrjarinne |
| 2002/0066055 A1 | 5/2002 | Kim |
| 2002/0102992 A1 | 8/2002 | Koorapaty et al. |
| 2003/0061018 A1 | 3/2003 | Snyder |
| 2003/0236089 A1 | 12/2003 | Beyme et al. |
| 2005/0004787 A1 | 1/2005 | Kubischta et al. |
| 2005/0085223 A1 | 4/2005 | Liu |
| 2006/0040616 A1 | 2/2006 | Wheatley |
| 2006/0046658 A1 | 3/2006 | Cruz et al. |
| 2006/0072466 A1 | 4/2006 | Wang et al. |
| 2006/0209866 A1 | 9/2006 | Steenkiste et al. |
| 2006/0223522 A1 | 10/2006 | Guo et al. |
| 2006/0229018 A1 | 10/2006 | Mlinarsky et al. |
| 2006/0229019 A1 | 10/2006 | Mlinarsky |
| 2006/0229020 A1 | 10/2006 | Mlinarsky et al. |
| 2006/0233111 A1 | 10/2006 | Wright |
| 2006/0239198 A1 | 10/2006 | Mlinarsky et al. |
| 2006/0247828 A1 * | 11/2006 | Ardila .................... G01C 23/00 701/14 |
| 2006/0252419 A1 | 11/2006 | Liu |
| 2006/0264178 A1 | 11/2006 | Noble et al. |
| 2007/0010940 A1 | 1/2007 | Tan et al. |
| 2007/0019769 A1 | 1/2007 | Green et al. |
| 2007/0257838 A1 | 11/2007 | Cheng |
| 2008/0056340 A1 | 3/2008 | Foegelle |
| 2008/0111738 A1 | 5/2008 | Han |
| 2008/0239972 A1 | 10/2008 | Omar |
| 2008/0287140 A1 | 11/2008 | Lee et al. |
| 2009/0002233 A1 | 1/2009 | Huang et al. |
| 2009/0047925 A1 | 2/2009 | Rahman |
| 2009/0051590 A1 | 2/2009 | Pitt et al. |
| 2009/0094492 A1 | 4/2009 | Music et al. |
| 2009/0305702 A1 | 12/2009 | Toppinen et al. |
| 2010/0019937 A1 | 1/2010 | Mori et al. |
| 2010/0033370 A1 | 2/2010 | Lopez et al. |
| 2010/0066599 A1 | 3/2010 | Liu et al. |
| 2010/0145616 A1 | 6/2010 | van Diggelen et al. |
| 2010/0233969 A1 | 9/2010 | Frolik et al. |
| 2010/0273504 A1 | 10/2010 | Bull et al. |
| 2010/0304686 A1 | 12/2010 | Kennedy et al. |
| 2011/0199255 A1 | 8/2011 | Murray et al. |
| 2011/0217937 A1 | 9/2011 | Cook |
| 2011/0230143 A1 | 9/2011 | Lundstrom et al. |
| 2011/0234455 A1 | 9/2011 | Rosenfeld et al. |
| 2011/0257923 A1 | 10/2011 | Boulton |
| 2011/0263215 A1 | 10/2011 | Asplund et al. |
| 2011/0306306 A1 | 12/2011 | Reed |
| 2012/0209519 A1 | 8/2012 | Basnayake |
| 2012/0282946 A1 | 11/2012 | Wigren |
| 2012/0309323 A1 | 12/2012 | Guo et al. |
| 2013/0021912 A1 | 1/2013 | Finlow-Bates et al. |
| 2013/0106655 A1 | 5/2013 | Pujante Cuadrupani |
| 2013/0154879 A1 | 6/2013 | Ramakrishnan et al. |
| 2013/0162466 A1 | 6/2013 | McDanell et al. |
| 2013/0217418 A1 | 8/2013 | Maurin et al. |
| 2014/0024318 A1 | 1/2014 | Sevindik et al. |
| 2014/0267690 A1 | 9/2014 | Morin et al. |
| 2014/0336923 A1 | 11/2014 | Hwang et al. |
| 2014/0343765 A1 | 11/2014 | Suiter et al. |
| 2015/0065165 A1 | 3/2015 | Zhang et al. |
| 2015/0226857 A1 | 8/2015 | Davies |
| 2015/0301190 A1 | 10/2015 | Osipov et al. |
| 2016/0097861 A1 | 4/2016 | Li et al. |
| 2016/0146944 A1 | 5/2016 | Geren et al. |
| 2016/0280401 A1 | 9/2016 | Driscoll et al. |
| 2016/0282473 A1 | 9/2016 | Driscoll et al. |
| 2017/0059715 A1 | 3/2017 | Wietfeldt et al. |
| 2017/0070971 A1 | 3/2017 | Wietfeldt et al. |
| 2018/0074209 A1 | 3/2018 | Madhow et al. |
| 2018/0292839 A1 | 10/2018 | Wei et al. |
| 2018/0372877 A1 | 12/2018 | Syrjarinne |
| 2019/0094379 A1 | 3/2019 | Chhokra et al. |
| 2019/0250277 A1 | 8/2019 | Miya et al. |
| 2019/0265365 A1 | 8/2019 | Skupin et al. |
| 2020/0274643 A1 | 8/2020 | Kodaypak et al. |
| 2021/0303932 A1 * | 9/2021 | Stefik ..................... G06N 5/01 |
| 2022/0018971 A1 | 1/2022 | Bennington et al. |
| 2022/0120914 A1 | 4/2022 | Johnson et al. |

FOREIGN PATENT DOCUMENTS

| | | | |
|---|---|---|---|
| CN | 108680937 A | | 10/2018 |
| CN | 109212570 A | | 1/2019 |
| CN | 109417595 A | | 3/2019 |
| CN | 111197986 A | * | 5/2020 ............. G01C 21/20 |
| CN | 114580168 A | * | 6/2022 |
| EP | 3064964 A1 | | 9/2016 |
| GB | 2492547 A | | 1/2013 |
| GB | 2601861 A | | 6/2022 |
| JP | H06334636 A | | 12/1994 |
| JP | H0962353 A | | 3/1997 |
| KR | 2023073417 A | * | 5/2023 ........ B60W 60/0011 |
| TW | 201022705 A | | 6/2010 |
| WO | 9903009 A2 | | 1/1999 |
| WO | 2010093999 A2 | | 8/2010 |
| WO | 2011046455 A1 | | 4/2011 |
| WO | WO-2020057292 A1 | * | 3/2020 ............. H01Q 1/242 |
| WO | 2022015873 A2 | | 1/2022 |

OTHER PUBLICATIONS

U.S. Appl. No. 17/374,885, filed Jul. 13, 2021, U.S. Pat. No. 11,287,531, Mar. 29, 2022, Granted.

U.S. Appl. No. 17/374,882, filed Jul. 13, 2021, U.S. Pat. No. 11,789,161, Oct. 17, 2023, Granted.

U.S. Appl. No. 17/374,891, filed Jul. 13, 2021, U.S. Pat. No. 11,536,855, Dec. 23, 2022, Granted.

(56) References Cited

OTHER PUBLICATIONS

U.S. Appl. No. 17/948,171, filed Sep. 19, 2022, US 20230128817, Apr. 27, 2023, Pending.
U.S. Appl. No. 17/948,176, filed Sep. 16, 2022, US 20230118946, Apr. 20, 2023, Pending.
U.S. Appl. No. 17/948,182, filed Sep. 16, 2022, US 20230121760, Apr. 20, 2023, Pending.
U.S. Appl. No. 17/948,190, filed Sep. 16, 2022, US 20230118232, Apr. 20, 2023, Pending.
U.S. Appl. No. 17/948,213, filed Sep. 19, 2022, Pending.
U.S. Appl. No. 18/369,114, filed Sep. 15, 2023, US 20240103181, Mar. 18, 2024, Pending.
U.S. Appl. No. 18/369,119, filed Sep. 15, 2023, US 20240094402, Mar. 21, 2024, Pending.
PCT/US21/41664, Jul. 14, 2021, WO2022015873, Jan. 20, 2022, Expired.
2110165.4, Jul. 14, 2021, GB 2601584, Jun. 8, 2022, Pending.
2110163.9, Jul. 14, 2021, GB 2601860, Jun. 15, 2022, Pending.
2110163.9, Jul. 14, 2021, GB 2601861, Jun. 15, 2022, Pending.
2391957.2, Jan. 25, 2023, Pending.
2413424.9, Sep. 12, 2024, Pending.
U.S. Appl. No. 17/948,171, filed Sep. 16, 2022, US 20230128817, Apr. 27, 2023, Pending.
U.S. Appl. No. 18/369,114, filed Sep. 15, 2023, Pending.
U.S. Appl. No. 18/369,119, filed Sep. 15, 2023, Pending.
User Manual—Detailed Guide to Usage of Application, Spirent Communications, dated Jul. 1, 2020, 17 pages.
PNT—Assurance System Architecture, Navigation Assurance Forecast, Spirent, dated Jun. 2020, 7 pages.
Autonomous emergency manoeuvering and movement monitoring for road and transport security, TransSec, dated Jul. 31, 2018, 33 pages.
Recommendation ITU-R P.1407-7, Multipath propagation and parameterization of its characteristics, Radiocommunication Sector of International Telecommunication Union, dated Aug. 2019, 31 pages.
Recommendation ITU-R P.681-11, Propagation data required for the design systems in the land mobile-satellite service, Radiocommunication Sector of International Telecommunication Union, dated Aug. 2019, 63 pages.
Radisic et. al., The Effect of Terrain Mask on RAIM Availability, Journal of Navigation, dated Jan. 2010, 15 pages.
Gadgil, Ring Buffers, Kalyani Gadgil's blog, dated Feb. 4, 2019, 5 pages. Retrieved on Jun. 18, 2020. Retrieved from the internet [URL: https://kalyanigadgil.wordpress.com/2019/02/04/ring-buffers/].
Hsu et. al., NLOS Correction/Exclusion for GNSS Measurement Using RAIM and City Building Models, Sensors, published Jul. 17, 2015, 21 pages.
GNSS Planning Website, Trimble, dated Jul. 27, 2018, 5 pages.
Spirent, Realistic Multipath and Obscuration Simulation—Simulating the Impact of the Local Environment on GNSS Signals, Spirent Sim3D, dated Jan. 2020, 4 pages.
Spirent, SimGEN Software Suite for Spirent GNSS Constellation Simulation Systems, dated May 2020, 45 pages.
GNSS Mission Planning, Navmatix, 4 pages. Retrieved on Jun. 17, 2020. Retrieved from the internet [URL: http://gnssmissionplanning.com/ ].
Recommendation ITU-R P.2145-2, Model Parameters for the physical-statisical wideband model, Radiocommunication Sector of International Telecommunication Union, dated Sep. 2017, 101 pages.
Rakipi et. al., Integrity Monitoring in Navigation Systems: Fault Detection and Exclusion RAIM Algorithm Implementation, Journal of Computer Communications, published May 28, 2018, 9 pages.
Technical Standard Order, Traffic Awareness Beacon System (TABS), Federal Aviation Administration—Department of Transportation, dated Oct. 10, 2014, 48 pages.
Berres et. al., GNSS Receiver Performance Assessment in Varied Multipath Environments with Real-World Simulation System, Association for Unmanned Vehicle Systems International (AUVSI) Proceedings, dated 2020, 17 pages.
Diggelen, End Game for Urban GNSS: Google's Use of 3D Building Models, Inside GNSS (IG), dated Mar. 21, 2021, 16 pages. Retrieved on Jul. 6, 2021. Retrieved from the internet [URL: https://insidegnss.com/end-game-for-urban-gnss-googles-use-of-3d-building-models/ ].
NovAtel Inc., An Introduction to GNSS—Chapter 5—Resolving Errors—Real-Time Kinematic, Second Edition, published 2015, 2 pages.
Section 2—Area Navigation (RNAV) and Required Navigation Performance (RNP), Federal Aviation Administration, 8 pages. Retrieved on Oct. 22, 2021. Retrieved from the internet [URL: https://tfmlearning.faa.gov/publications/atpubs/AIM/Chap1/aim0102.html#RCtM?129mweb ].
Synopsys, The 6 Levels of Vehicle Autonomy, dated 2021, 7 pages. Retrieved on Oct. 22, 2021. Retrieved from the internet [URL: https://www.synopsys.com/automotive/autonomous-driving-levels.html ].
Stanford, Ray Tracing Alternatives, dated 1997-98, 2 pages. Retrieved on Jun. 15, 2021. Retrieved from the internet [URL: https://cs.stanford.edu/people/eroberts/courses/soco/projects/1997-98/ray-tracing/alternatives.html ].
Li et. al., A Tightly Coupled Positioning Solution for Land Vehicles in Urban Canyons, Hindawi, Journal of Sensors, dated 2017, 11 pages.
OneSky SDSP Services, OneSky Systems Inc., 7 pages. Retrieved on Oct. 22, 2021. Retrieved from the internet [URL: https://saas.onesky.xyz/SDSP/Documentation/Navigation ].
PCT/US2021/041664—Partial Search Report dated Nov. 4, 2021, 18 pages.
Nakaaki et al., "Development of a Precision Index and a Precision Forecast System for RTK-GNSS", 2019 IEEE Vehicular Networking Conference (VNC), 3-5-1 Johoku, Hamamatsu, Shizuoka 432-8011, Japan, Dec. 4, 2019, pp. 1-7.
Suh et al, "Evaluation of Satellite-Based Navigation Services in Complex Urban Environments Using a Three-Dimensional GIS", IEICE Transaction on Communication, Communications Society, Tokyo, JP, vol. E90B, No. 7, Jul. 1, 2007, pp. 1816-1825.
Causa et al., "Multi-UAV Path Planning for Autonomous Missions in Mixed GNSS Coverage Scenarios", SENSORS, vol. 18, No. 12, Nov. 29, 2018, 27 pages.
Spirent, "Enabling reliable GNSS performance for autonomous urban driving", a Spirent Ebook, Oct. 5, 2021, 12 pages.
Parkinson et al., "Global Positioning System: Theory and Applications", vol. 1, vol. 163 Progress in Astronautics and Aeronautics, Published by the American Institute of Aeronautics and Astronautics, Inc., Washington, DC, 1996, 44 pages.
Geohash, Wikipedia—Geohash 2008 public domain, 7 pages, retrieved on Dec. 22, 2010. Retrieved from the internet [URL: http://en.wikipedia.org/wiki/Geohash ].
Anonymous, Algorithm for Finding Nearby Points?—Stack Overflow, 3 pages, retreieved on Dec. 22, 2010. Retrieved from the internet [URL: http://stackoverflow.com/questions/838344/algorithm-for-finding-nearby-points ].
Butler, Playing Nice—LBS and Hybrid location technologies, EETImes, dated Dec. 8, 2009, 4 pages. Retrieved on Dec. 22, 2010. Retrieved from the internet [URL: https://www.eetimes.com/General/DisplayPrintViewContent?contentItemId=4016855 ].
Kojo, Seawind: a WIreless Network Emulator, Proceedings of 11th GI/ITG Conference of Measuring, Modelling and Evaluation of Computer and Communication Systems, 2001, 16 pages.
CiteSeerX—Seawind: a Wireless Network Emulator Summary, dated 2001, 2 pages, retrieved on Feb. 20, 2014. Retrieved from the internet [URL: http://citeseerx.ist.psu.edu/viewdoc/summary?doi=10.1.1.25.3281].
INS—Integrated Navigation Systems, GNSS Product Design, GNSS Solutions. Retrieved on Sep. 21, 2012. Retrieved from the internet [URL: http://inavsystems.com/index_files?Page607.htm ].
Global Positioning System. Wikipedia, the Free Encyclopedia. last modified on Nov. 6, 2012, retrieved on Nov. 9, 2012. Retrieved from the internet <http://en.wikipedia.org/w/index.php?title=Global_Positioning_System&oildid=521739076>.

(56) References Cited

OTHER PUBLICATIONS

Synchros Interactive, Proximity Searching with GeoHash, dated Aug. 2, 2010, 4 pages. Retrieved on Dec. 22, 2010. Retrieved from the internet [URL: http://www.synchrosinteractive.com/blog/1-software/38-geohash ].

Eppstein, Geometry in Action, Cartography and Geographic Information Systems, 6 pages, retrieved on Dec. 9, 2010. Retrieved from the internet [URL: http://www.ics.uci.edu/~eppstein/gina/carto.html ].

Gupta R, How to Use GNSS Simulators to Test RTK Positioning Systems, Spirent.com, Feb. 1, 2016, 6 pages (downloaded from https://spirent.com/blogs/how-to-use-gnss-simulators-to-test-RTK).

Obst et al "Urban Multipath Detection and Mitigation with Dynamic 3D Maps for Reliable Land Vehicle Localization", Proceedings of IEEE Ion Plans 2012, /Ion Plans, Apr. 26, 2012 (Apr. 26, 2012), pp. 685-691.

Zhang et al "A New Path Planning Algorithm Using a GNSS Localization Error Map for UAVs in an Urban Area", Journal of Intelligent, vol. 94, No. 1, Aug. 3, 2018 (2018-08-03), pp. 219-235.

PCT/US2021/041664—Internatioal Search Report & Written Opinion dated Mar. 31, 2022, 34 pages.

GB2110163.9—Partial Search Report dated Apr. 6, 2022, 2 page.

GB2110164.7—Search Report dated Apr. 6, 2022, 2 pages.

GB2110165.4—Search Report dated Apr. 4, 2022, 1 pages.

Anonymous, The Essential CDN Guide—Chapter 1, What is a CDN, Imperva, retreived on Jun. 3, 2022, 14 pages. Retrieved from the internet [URL: https://www.imperva.com/learn/performance/what-is-cdn-how-it-works/ ].

Misener, SAE Connected Vehicle Standards, SAE International, CES 2016, dated Jan. 6, 2016, 10 pages.

Pineiro et al., How to evaluate models: Observed vs. predicted or predicted vs. observed, Ecological Modelling, dated Sep. 2008, 2 pages.

GB2110163.9—Search Report dated Apr. 12, 2022, 2 pages.

Imperva, The Essential CDN Guide, Chapter 1: What is a CDN?, Apr. 22, 2019, 5 pages.

PCT/US2021/041664—2nd Written Opinion dated Dec. 12, 2022, 16 pages.

GB2110165.4—Further Search Report dated Jan. 20, 2023, 3 pages.

PCT/US2021/041664—International Preliminary Report of Patentability dated Mar. 14, 2023, 17 pages.

GB2301057.2—Combined Search and Examination Report dated Jul. 21, 2023, 9 pages.

GNSS Foresight, Spirent Communications, Inc., Jun. 12, 2022, 9 pages (downloaded from https.www.spirent.com/products/gnss-foresight-forecasting.com).

GNSS Foresight for aviation, Spirent Communications, Inc. Jan. 2022, 4 pages.

Achieving Reliable GNSS Performance for Autonomous UAS Navigation, Spirent Communications, Inc,, MCD00454, Issue 1-00, Sep. 2021, 12 pages.

Spirent Charts the Way Forward For Autonomous Systems with Industry-first BVLOS Mission Ebabler, Spirent Communications, Inc., Sep. 20, 2021 (downloaded from hhttps://www.spirent.com/newsroom/press-releases/spirent-charts-the-way-forward-for-autonomous-systems-with-industry-first Feb. 24, 2022].

Spirent Brings Realistic Testing to Emerging LEO Satellite Applications, Spirent Communications, Inc., Dec. 4, 2022, 4 pages (downloaded from https://www.spirent.com/newsroom/press-releases/spirent-brings-realistic-testing-to-emerging-leo-satellite-applications).

LEO Azimuth Tracking! APRS.org, (downloaded Sep. 14, 2023 from http://aprs.org/LEO-tracking.htm).

Giggenbach et al, System Aspects of Optical Leo-To-Ground Links, ICSO 2016 International Conference on Space Optics, Oct. 18-21, 2016, 8 pages.

GB2301057.2—Response to Combined Search and Examination Report filed Sep. 16, 2024, 14 pages.

\* cited by examiner

Ideal Map & Point 2D Example Error Calculation (no cuboid)

Angle/Estimates calculated from Satellite Position & Point on Earth

Example
 A= 20,200 Km
 B= Building Height = 33m
 D= Distance from point to building on ground = 30m
 θ= tan-1 (B/D) = 47.73°

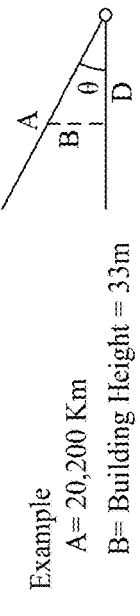

For Map variability of 3 meters:
 B=30m  θ=45°
 B=36m  θ=50.19°
 Variability of θ = Δθ =5.19°

X = distance of orbit path
X = (A2 + A2 - 2 x A x A x cosΔθ)**.5
X = 1,830,703 meters

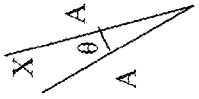

Speed of Satellite = 14km/hr = S
time to travel X = t
t = X/S = 7.85 minutes
Forecast Period = P = 180 minutes
Forecast Period Error = t/P = e
e = 4%

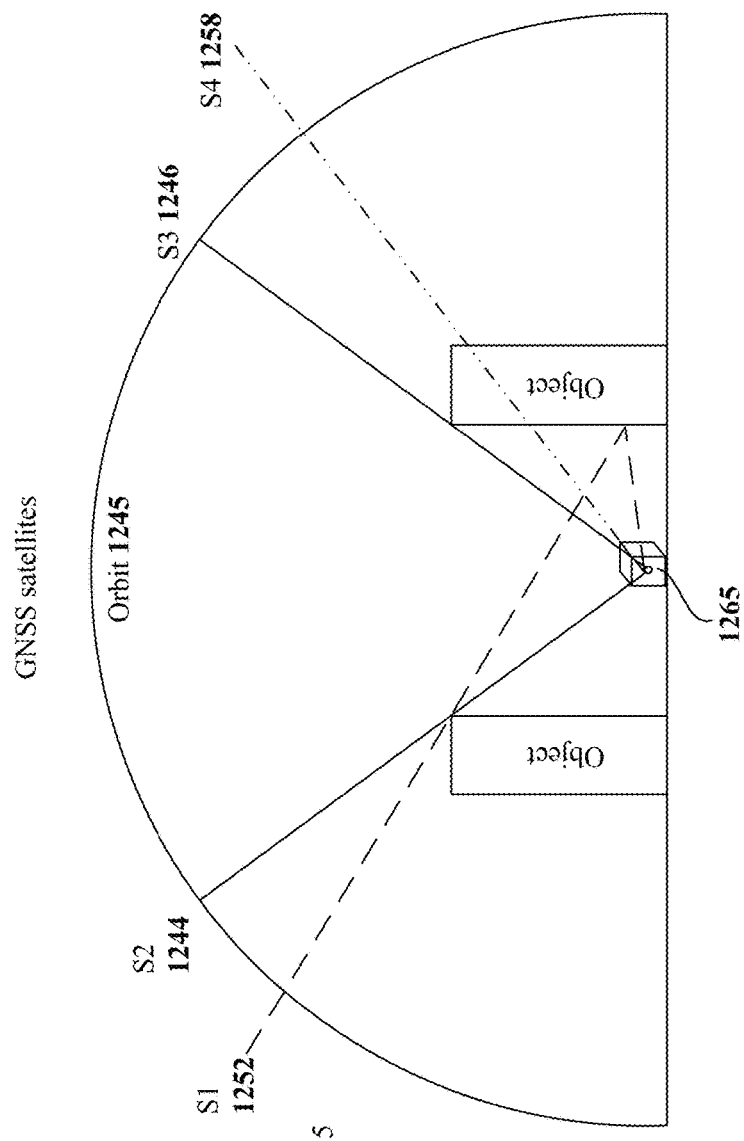

FIG. 12

GENERATING AND DISTRIBUTING GNSS RISK ANALYSIS DATA FOR FACILITATING SAFE ROUTING OF AUTONOMOUS DRONES

PRIORITY

This application claims the benefit of U. S. Provisional Patent Application No. 63/407,579 entitled "Generating and Distributing GNSS Data for Facilitating Safe Routing of Autonomous Drones," filed 16 Sep. 2022.

This application is also a continuation in part of U.S. application Ser. No. 17/706,421 titled "Enhancing RTK Position Resolution Using An RTK-Enabled GNSS Positioning Receiver," filed 28 Mar. 2022 which is a continuation U.S. application Ser. No. 17/374,885 titled "Enhancing RTK Position Resolution Using An RTK-Enabled GNSS Positioning Receiver," filed 13 Jul. 2021, now U.S. Pat. No. 11,287,531, issued 29 Mar. 2022. which claims priority to U. S. Provisional Patent Application Nos. 63/051,849 entitled "An Architecture for Providing Forecasts of GNSS Obscuration and Multipath," filed 14 Jul. 2020 and 63/161,386 entitled "An Architecture for Providing Forecasts of GNSS Obscuration and Multipath," filed 15 Mar. 2021. The priority applications incorporated by reference for all purposes.

RELATED CASES

This application is related to the following contemporaneously filed applications:
U.S. application Ser. No. 17/948,171 titled "GNSS Forecast Impacting Receiver Startup," filed 19 Sep. 2022; and
U.S. application Ser. No. 17/948,176 titled "GNSS Forecast and Spoofing/Jamming Detection," filed 19 Sep. 2022; and
U.S. application Ser. No. 17/948,182 titled "GNSS Forecast and Background Obscuration Prediction," filed 19 Sep. 2022; and
U.S. application Ser. No. 17/948,190 titled "GNSS Forecast and Line of Sight Detection," filed 19 Sep. 2022; and
U.S. application Ser. No. 17/948,213 titled "Utilizing GNSS Risk Analysis Data for Facilitating Safe Routing Of Autonomous Drones," filed 19 Sep. 2022.

The related applications are incorporated by reference for all purposes.

INCORPORATIONS

The following materials are incorporated by reference for all purposes as if fully set forth herein:
U.S. application Ser. No. 17/374,882, titled "Improving Accuracy of a GNSS Receiver That has a Non-Directional Antenna," filed 13 Jul. 2021; and
U.S. application Ser. No. 17/374,891, titled "Path Planning Using Forecasts of Obscuration and Multipath," filed 13 Jul. 2021; and
Recommandation ITU-R P.681-11 (August 2019), Propagation data required for the design systems in the land mobile-satellite service; and
Report ITU-R P.2145-2, (September 2017), Model parameters for the physical-statistical wideband model in Recommendation ITU-R P.681; and
Recommendation ITU-R P.1407-7, (August 2019), Multipath propagation and parameterization of its characteristics; and
GB Application No. 1111305.7, titled Recording, Storage and Playback of GNSS Signals, filed 4 Jul. 2011, now GB Patent No. 2492547, issued 7 Nov. 2018; and
U.S. application Ser. No. 13/786,20, titled System and Method for Testing Real World A-GNSS Performance of a Device, filed 5 Mar. 2013, now U.S. Pat. No. 9,519,063, issued 13 Dec. 2016; and
Federal Aviation Administration (FAA) Technical Standard Order (TSO)-C199 for Traffic Awareness Beacon System (TABS)

FIELD OF THE TECHNOLOGY DISCLOSED

The technology disclosed relates to data processing, vehicles, navigation, and relative location. The technology disclosed provides for electrical computers, digital data processing systems, and data processing processes for transferring data between a plurality of computers or processes wherein the computers or processes employ the data before or after transferring and the employing affects the transfer of data therebetween.

In particular, the technology disclosed relates generally to the field of Global Positioning System (GPS), Global Navigation Satellite Systems (GNSS), radio navigation, positioning, navigation, and timing. More specifically, the technology focuses on the process for generating a risk analysis of GPS/GNSS signals based on analysis of historical data and 3D maps and then providing the risk analysis over an Internet cloud architecture to users. The disclosed system can also be delivered to a customer as a platform, or to their computing entity for their use, including as an element on the end user device.

The disclosed process uses various methods to determine historical satellite obscurations based on position, time, environmental data, and maps. This historical analysis is used to plot out risk analyses, which can include worst-case and best-case risk analyses. The plots are refreshed periodically, to assure continuing validity as satellite vehicle orbits change and constellations add or lose satellites. The disclosed architecture includes the design, interfaces, and methods to gather historical satellite data, environmental data, maps, algorithms, store data, distribute on a cloud architecture, or by other means including elements installed on end user devices, or using data collected by the end user device, and interface with users.

BACKGROUND

The subject matter discussed in this section should not be assumed to be prior art merely because of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Connected Autonomous Vehicles (CAV) and vehicles with Advanced Driver-Assisted Systems (ADAS) require reliable GPS sensor information. In one example, an autonomous vehicle needs to have reliable positioning information for safety. The absence of good GPS signal coverage can cause malfunctions in the decision-making logic of an automated or self-driving car, causing it to navigate incorrectly and potentially collide with traffic. In another example, for an Unmanned Aerial System (UAS/drone) being used for package delivery or survey relies upon consistent highly accurate GPS positioning. The result of encountering an area of poor GPS coverage can be the failure of a package delivery, non-compliance with Remote Identification requirements, non-conformance to the approved operational airspace, or even increased risk of collision with other aircraft.

An opportunity arises for providing periodically refreshed risk analyses are disclosed that simplify routing over paths that have reliable GNSS signals. A worst-case risk analysis can be processed by routing algorithms to find always available routes, which did not depend on the time of day. The always available routes in a worst-case risk analysis can be used without need for or analysis of granular forecast data. A best-case risk analysis, alternatively, can be processed by routing algorithms to determine sometimes available routes, which are only available part of the day, and then to request granular forecast data that permits scheduling of travel over the sometimes available routes.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 12 shows an example 2D orbit cross-section with four GNSS satellites, and an example error calculation for a point.

DETAILED DESCRIPTION

Figure 1:
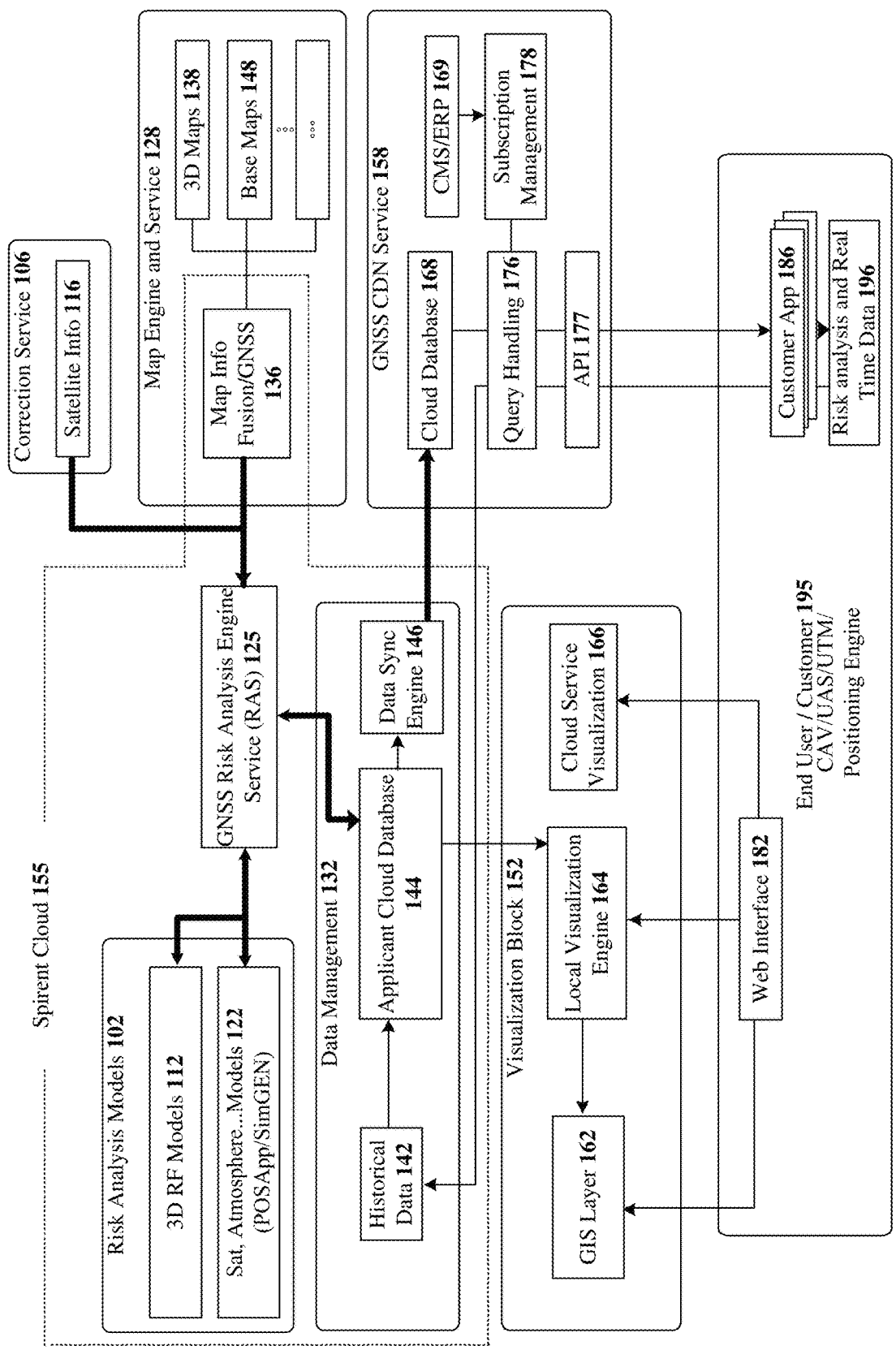
FIG. 1 shows example architecture for providing dilution of precision (DOP) forecasts for GNSS navigation for routing of vehicles or alerting humans in vehicles, according to one embodiment of the disclosed technology.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Prior applications have described making dilution of precision forecasts (DOP) and satellite line-of-sight visibility forecasts for GNSS navigation that can be used for routing of vehicles and distributing the forecasts. This application moves from forecasting to risk analysis.

Risk analysis reveals paths that can always (worst-case) or just sometimes (best-case) be followed by an autonomous vehicle and be assured of adequate GNSS coverage. A risk analysis, unlike a forecast, is based on historical data. For instance, three days at 0, minus 10 and minus 20 can be chosen for risk analysis. For each day of historical data, ray casting can be applied second-by-second to cuboids in a region of interest. The number of satellite vehicles with a clear line of sight from each cuboid can be tallied and DOP calculated. Adequacy of GNSS coverage can be judged by the number of satellites clearly visible and/or their relative geometry. Counts or more sophisticated DOP calculation can be produced. For each day processed, there will be a best-case and worst-case analysis of coverage for each cuboid. Analysis from the three days can be combined into overall best- and worst-case analyses.

A buffer zone can be drawn around impaired areas in a worst-case plot of inadequate signal. The buffer zone will increase confidence that a chosen path avoids areas of inadequate GNSS coverage.

These inventors empirically determined that paths that have adequate coverage throughout three non-consecutive historical days of worst-case analysis with buffers, will be available for an extended period of three to four months and sometimes longer. Using sampling from historical data, it has been estimated that a risk analysis can be generated from just three days of historical data that is 95 to 99 percent accurate and remains so for one week to six months, typically three to four months. That is, only one to five in 100 cuboids in the region of calculation that the risk analysis indicates will have an adequate signal will actually have an inadequate signal at some time during a day. We believe this degree of reliability will satisfy safety guidelines applicable to autonomous drones.

When the worst-case risk analysis does not reveal any path that always is available, the best-case risk analysis may show the likelihood that such a path will available, at some time. Then, the forecast data described in prior applications can be acquired and used to select a time to travel and a path along which adequate coverage is available.

The combination of worst-case and best-case risk analysis provides a tiered approach to routing autonomous vehicles, particularly drones. With the worst-case analysis in hand, aerial thoroughfares can be plotted, and much routing can be simplified. Fleets of drones can be deployed for autonomous delivery without requiring precise forecast data for each drone. With the best-case analysis in hand, routes can be selected for further analysis. This limits the amount of detailed data that needs to be obtained and processed for routing. Detailed forecast data can be obtained, and delivery times can be set for difficult to reach destinations.

Not surprisingly, worst-case risk analyses produce different results for urban canyons lined by tall buildings than for rural or suburban areas with modest residences Urban areas may always require detailed time-specific forecasts, due to tall buildings and changing patterns of satellite coverage. In suburbs, in contrast, the main challenge is likely to be safe landing sites for drop off. Many suburban residences can be reached following aerial thoroughfares, but some residences may nonetheless have limited times for well-positioned drop offs. A residence may have a 10-meter perimeter of impaired GNSS visibility in the worst-case risk analysis, but a two-meter perimeter in the best-case risk analysis, which makes some times better than others for drop offs. The disclosed risk analysis simplifies routing.

In the sections that follow, we recap the problem of providing GNSS data for vehicle navigation, describe preparation of risk analyses and then recap the forecast technology disclosed in prior applications assigned to the same applicant.

At a high level, autonomous or assisted navigation often depends on positioning information from satellite constellations, from GPS, in the United States, and GNSS, more generically. There are known problems with GNSS positioning, including obscured signals and multi-pathing. Estimates of the reliability GNSS positioning are important to autonomous vehicles, both ground vehicles and flying vehicles.

Urban and suburban areas present different classes of problems. Tall buildings both obscure signals and reflect signals, producing multi-pathing. A GNSS receiver in an urban canyon can see only a narrow slice of the sky. It still receives signals from many satellites, reflected off buildings and flat surfaces. However, the distance traveled is extended when signals are reflected, as opposed to signals received on a line of sight. GNSS receivers strive for accuracy within 3 feet. This accuracy is difficult to obtain for a reflected signal that travels 100 feet further than a line-of-sight signal would.

Even rural areas are subject to obscured signals and multi-pathing. Trees, for instance, partially obscure satellite signals. Hilly or mountainous countryside surfaces can induce multi-pathing. These effects are less dramatic in rural areas than in urban canyons.

Conditions between the satellite and receiver can partially obscure and disrupt signals. These conditions include both weather in the atmosphere and energizing of the ionosphere by solar disturbances.

One approach to signal reliability has been crowd sourcing of receiver estimates of locations from actual vehicles. The problem is that receivers sometimes are biased towards being overly confident about their position estimate. Nonetheless, Uber uses a client-server architecture and crowd sourcing to construct a probability distribution model of the SNR under LOS and shadowed condition is usable for determining the likelihood of the SNR measured for the satellite, and this can be duplicated over a grid of possible locations to obtain a likelihood surface—or heat map—of possible receiver locations, based on satellite signal strengths, for probabilistic shadow matching. The heat map from probabilistic shadow matching has many local maxima and the GNSS fix can have large outliers, driving the use of filters to approximate arbitrary distributions, at the expense of high complexity. The accuracy is also limited by the quality of the crowd-sourced 3D maps.

Limitations of crowd sourced statistical models motivated both the current risk analysis technology and the previously disclosed forecast assured navigation (FAN), using simulation for generating prediction of GPS/GNSS signals based on time, position, environmental data, and maps. The now disclosed GNSS risk analyses identify areas within regions have reliable coverage.

Acronyms

Acronyms used in this disclosure are identified the first time that they are used. These acronyms are terms of art, often used in standards documents. Except where the terms are used in a clear and distinctly different sense than they are used in the art, we adopt the meanings found in testing standards. For the reader's convenience, many of them are listed here:

| | |
|---|---|
| ADAS | Advanced Driver-Assisted System |
| AGL | Above Ground Level |
| API | Application Programming Interface |
| ASIL | Automotive Safety Integrity Level |
| AWS | Amazon Web Services |
| BVLOS | Beyond Visual Line of Sight |
| CAV | Connected Autonomous Vehicles - self-driving cars and autonomous drones |
| CMS | Content Management System |
| CDN | Content Delivery Network |
| CDNG | CDN Gateway |
| DAV | Detect and Avoid |
| DCM | Digital City Map |
| DEM | Digital Elevation Model |
| DSM | Digital Surface Model - earth's surface and objects on it |
| DOP | Dilution of Precision |
| DTM | Digital Terrain Model |
| ERP | Enterprise Resource Planning |
| eVTOL | Electric Vertical Takeoff and Landing |
| F2CDNS | Forecast to CDN Service |
| FAN | Forecast Assured Navigation |
| FBX | Autodesk FilmBox Format (3D Data Interchange) |
| FCaaS | Flight Check as a Service |
| FC | Forecast Controller |
| FCBS | Forecast Call-back Service |
| FES | Forecast Engine Service |
| FO | Forecast Orchestrator |
| FPS | Forecast Processing Store |
| FWS | Forecast Worker Service |
| GIS | Geographical Information System |
| GNSS | Global Navigation Satellite System |
| GPS | Global Positioning System |
| GPU | Graphics Processing Unit |
| gRPC | Open-source Remote Procedure Call |
| HAV | Hybrid Air Vehicles |
| IaaS | Integrity as a Service |
| JSON | JavaScript Object Notation |
| LES | Logging and Event Service |
| LOS | Line of Sight |
| MCS | Map Curation Service |
| MPP | Map Processing Pipeline |
| NLOS | Non-Line of Sight |
| NTP | Network Time Protocol |
| ODD | Operational Design Domain |
| OPR | Orbit Prediction Runner |
| OPS | Orbit Prediction Service |
| OSR | Observation Space Representation |
| P2CDNS | Public to CDN Service |
| PDOP | Position Dilution of Precision |
| PNT | Position, Navigation and Time |
| POC | Proof of Concept |
| PosApp | Positioning Application - Proprietary Spirent software application for multi-channel satellite navigation (GNSS) simulation systems |
| PPP | Precise Point Positioning |
| RAIM | Receiver Autonomous Integrity Monitoring |

-continued

| | |
|---|---|
| RDVS | RINEX Downloader & Validator Service |
| REST | Representational State Transfer |
| RINEX | Receiver Independent Exchange Format |
| RM | Road Map |
| RNAV | Area Navigation |
| RNP | Required Navigation Performance |
| RPC | Remote Procedure Call |
| RTK | Real-Time Kinematic |
| SCS | Schedule Curation Service |
| SDSP | Supplemental Data Service Provider |
| SHP | Shape File - commercial standard for representing geospatial vector data |
| SimGEN | Mode of PosApp: full scenario environment development capability; extended data input/output options, user action and commands; advanced remote control |
| SLA | Service Level Agreement |
| SQL | Structured Query Language |
| SS | Scheduler Service |
| SSR | State Space Representation |
| TDOA | Time Difference of Arrival - multilateralization for geolocation of RF emitters |
| TRANSSEC | Transmission Security |
| TSE | Total System Error |
| TTA | Time to Alarm |
| UA | Unmanned Aircraft |
| UAAA | Urban Advance Air Mobility |
| UAS | Unmanned Aerial System |
| UAV | Unmanned Aerial Vehicles |
| USS | Unmanned Service Supplier |
| UTM | Universal Transverse Mercator coordinate system |
| UTMP | Unmanned Traffic Management Program |
| VMPS | Vendor Map Processing Service |
| VOP | Valid Observable Points |
| WAAS | Wide Area Augmentation System |
| WGS84 | U.S. DoD global reference system for geospatial information for GPS |

The Forecast Assured Navigation (FAN) technology previously disclosed and improved upon in this disclosure addresses the need of GNSS receivers, measurement engines, positioning engines, consumer devices, telecommunication equipment, navigation systems, avionics, and vehicles' "clients" that use GNSS as a source of position, navigation and timing to know where and when GNSS signals will be available, impaired, or not available. Clients can exist in a laboratory environment for test and validation, in a planning system before operation of a system, or in a live environment where the client is in an operational vehicle. Existing integrity and augmentation techniques consider many variables, such as the atmosphere, satellite errors and orbits, to improve the performance and reliability of the client. The local environment, such as buildings, are not known to the client and are one of the primary unaddressed sources of errors due to loss of the signal due to obscuration or interference of the signal due to partial obscuration of the signal and multipath. When the client is given a prediction of GNSS obscurations and multipath, the client can either plan to avoid areas or use the prediction to improve performance of the client.

Autonomous vehicles can benefit from improved information about the reliability of the signals being processed by GNSS receivers. This information is useful both in real time and for route planning. The process of generating a prediction of GPS/GNSS signals based on time, position, environmental data, and maps uses various methods to determine satellite obscurations based on position, time, environmental data, and maps. Moreover, the process uses various methods to determine satellite signal degradation due to multipath and other interference based on position, time, environmental data, and maps.

Risk analyses, including worst-case and best-case analyses, improve on FAN. The worst-case risk analyses, periodically refreshed, allow routing of autonomous vehicles, even fleets of drones, without reliance on detailed FAN forecasts. Some environments, documented by worst-case risk analysis, are clear enough to permit establishment of virtual thoroughfares that experience GNSS coverage adequate for autonomous navigation throughout the day. The best-case risk analyses reduce the amount of FAN data that needs to be requested and analyzed, to schedule autonomous navigation, by allowing selection of a route that occasionally will have adequate GNSS coverage and requesting only the data needed to find the right time of day for a delivery. This can be substantially less data than would be requested to pick the route. In addition to these uses, it is expected that additional uses will be found for the disclosed risk analysis technology.

The previously disclosed technology for Forecast Assured Navigation (FAN) uses environmental data (maps containing building locations, terrain, vegetation, and other obstacles) to determine GNSS satellite obscurations (line-of-sight, non-line-of-sight, out-of-view) at some time in the past, present, or future and for specific locations, also referred to as a GNSS obscuration forecast. This technology also can use environmental data (maps containing building locations, terrain, vegetation, and other obstacles) to determine GNSS satellite multipath at some time in the future and for specific locations, referred to as a GNSS multipath forecast.

The Forecast Assured Navigation (FAN) technology features an obscuration forecast and a multipath forecast, that enable determining in advance where and when GNSS is reliable. FAN is a cloud-based service which provides additional forecast information about the expected GNSS visibility for specific regions around the world, as requested by the end user. This service differs from existing solutions as it also considers the terrain and the built-up environment instead of assuming open sky. SaaS supports receivers, positioning engines and navigation systems to provide better situational awareness of the GNSS signals they are receiving. The additional information is computed by applicant using present satellite orbits, GNSS simulators and high-definition 3D maps to investigate the future and provide the intended solution with a much more precise expected satellite signal visibility than would be available otherwise. This technology supports features for autonomous ground-based vehicles for real-time planning and operation, including automated lane control with or without a known path, and for mission planning for future routes.

We disclose applying the ray casting technology described for FAN to risk analysis based on historical data recording actual satellite paths. Satellite vehicles in the positioning constellations follow actual orbits that vary from their predicted orbits. Variations in the earth's gravitational field and drag on satellites slowly change satellite orbits. Use of repositioning thrusters creates substantial, abrupt changes in satellite orbits. In 2022, at the filing of this application, it was estimated that a satellite repositioning event happens every three to four weeks. Some repositioning events change the number of satellite vehicles visible in impacted regions. Others have minimal impact. The technology disclosed includes evaluation of the amount of data required to produce a reliable forecast, by comparing results of sparse sampling against results of exhaustive analysis of historical satellite orbit data over an extended time. For instance, risk analysis based on data from just three days, days 0, −10, and −20, has been compared to exhaustive analysis from day 0 backwards to day −200. Sampling frequencies and sampling patterns have been evaluated to determine how many weeks or months a risk analysis can be considered valid, without being so conservative as to rule out routes that have adequate GNSS coverage.

A system architecture for providing dilution of precision (DOP) forecasts for GNSS navigation for routing of vehicles or alerting humans in vehicles is described next.

System Architecture

FIG. 1 shows example system architecture 100 for providing dilution of precision (DOP) risk analysis, similar to the previously disclosed system for providing forecasts for GNSS navigation for routing of vehicles or alerting humans in vehicles. The architecture includes the design and interfaces for gathering satellite data, environmental data, maps, and algorithms, and for storing data via data management, distributing on a cloud architecture, and interfacing with users. Because FIG. 1 is an architectural diagram, certain details are intentionally omitted to improve clarity of the description. The discussion of FIG. 1 is organized as follows. First, the elements of the figure will be described, followed by their interconnections. Then, the use of the elements in the system will be described in greater detail.

System architecture 100 includes applicant's cloud 155 with GNSS risk analysis engine service (RAS) 125, map engine and service 128, GNSS CDN service 158, visualization block 152 and end user/customer positioning engine 195. GNSS risk analysis service (RAS) 125 interfaces with a historical data module and simulation/algorithm module and calculates historical availability of GNSS signals for geographically defined areas. The analyses from the GNSS risk analysis service (RAS) 125 are stored and then published to the cloud architecture. Applicant's cloud 155 includes risk analysis service (RAS) 124 that utilizes historical data and ray casting models. Alternatively, ray tracing could be used, but it requires more computing. Ray casting models 102 include 3D RF models 112 and access to historical satellite atmosphere models. Satellite information 116 can be compiled in real time from a correction service 106 and retained as historical data 142. Risk analysis service (RAS) 124 receives map info fusion/GNSS 135 via map engine and service 128, and stores and retrieves GNSS risk analyses in Spirent's cloud database 144 as part of data management 132, which also includes historical data 142.

Data sync engine 146, in one example, works similarly for GNSS risk analysis and Forecasts, sending data to cloud database 168 in GNSS CDN service 158, as part of data management 132. Map engine and service 128 also includes 3D maps 138 and base maps 148 among others maps. GNSS CDN service 158 includes query handling 176 via API 177 to customer app 186 in end user/customer positioning engine 195, which also handles risk analysis and real time data 196 from customer positioning engine 195. GNSS CDN service 158 also handles GNSS Forecast subscriptions via subscription management 178 controlled by CMS/ERP 169. Additionally, visualization block 152 interfaces with customer positioning engine 195 via web interface 182 via local visualization engine 164, cloud service visualization 166 and GIS layer 162. Local visualization engine 164 displays risk analyses and forecasts stored in applicant cloud database 144 in one implementation of the system.

The disclosed cloud architecture provides a globally distributed, low latency, high-availability system for clients to request GNSS risk analysis and forecasts. Clients can request the GNSS risk analysis and predictions for several applications including, but not limited to planning engines, routing engines, GNSS receivers, measurement engines, positioning engines, consumer devices, telecommunication equipment, navigation systems, avionics, and vehicles for planning, operation, or validation. The disclosed Risk Analysis Service (RAS) inputs a map and satellite orbits, and outputs a risk analysis based on LOS/NLOS and/or PDOP for each 1 $m^2$ point within the map, in one implementation.

Figure 2:
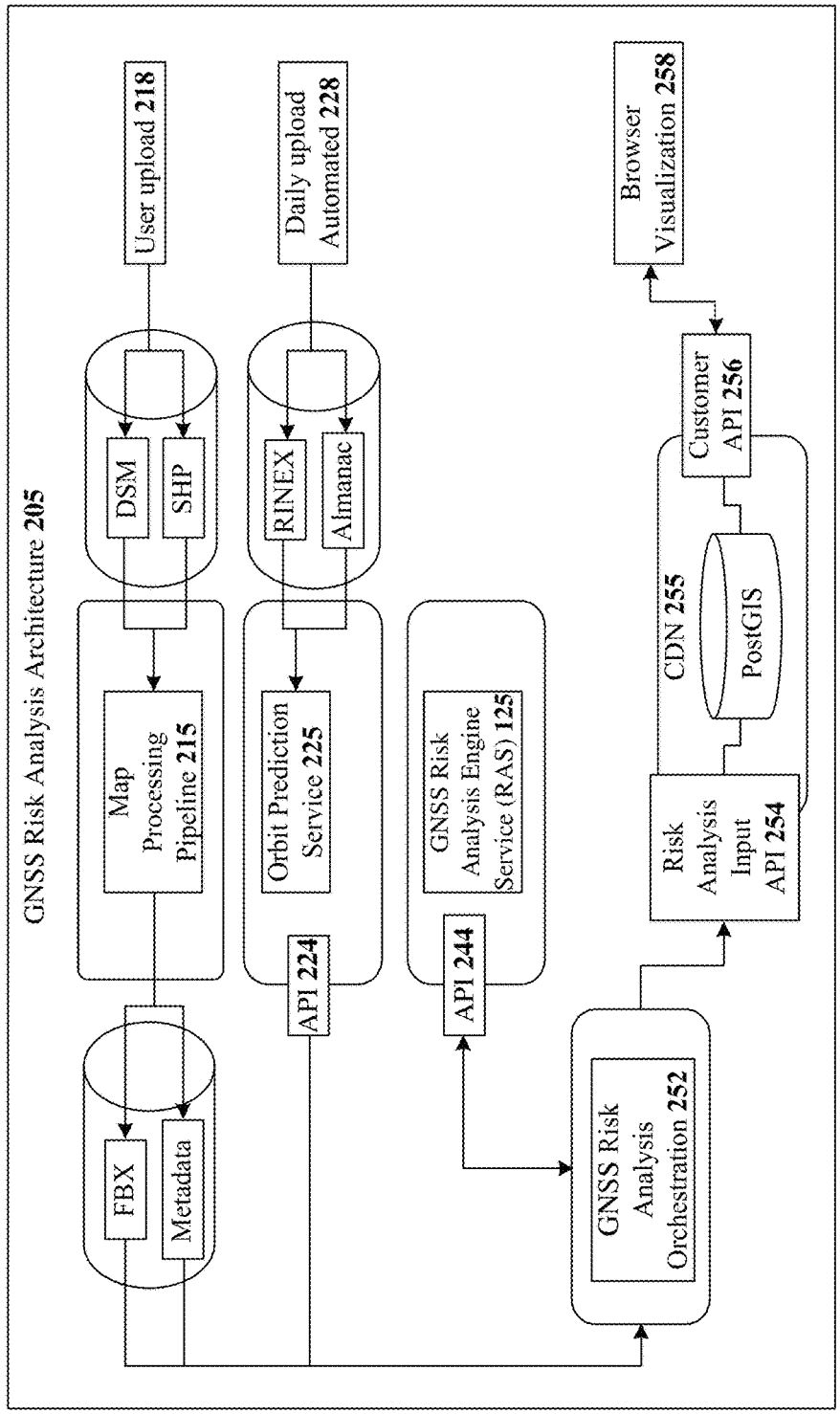
FIG. 2 shows an alternate implementation in which GNSS Forecasts are stored directly from the forecast engine to the CDN.

FIG. 2 shows the block diagram for an example system implementation in which GNSS risk analyses are stored directly from the risk analysis engine to the CDN, an alternative to redundant data management described relative to FIG. 1. This, again, builds on previously disclosed forecasting technology. The block diagram of GNSS risk analysis architecture 205 utilizes multiple modules. User upload 218 provides inputs to map processing pipeline 215 as digital surface model (DSM) of the earth's surface and objects on it, and shapefile (SHP) that represents shapes as geospatial vector data. Map processing pipeline 215 completes the initial map processing and outputs 3D map data in FBX 3D data interchange format (FilmBox), along with at least one metadata file that describes the map data. The FBX is a 3D model mesh suitable for loading into a GPU and the metadata file contains geographic information about the FBX such as where the FBX "tile" is located on the earth's surface and a list of valid observable points (VOPs). FBX tiles can be different sizes. Processing to 1 $Km^2$ utilizes VOPs in a grid of cuboids at 1 m intervals, in one implementation. When creating VOPs, the building footprints are typically masked to not include VOPs inside of buildings. Automated daily upload 228 provides to orbit plotting service 225 historical data for recent satellite paths. It also can provide the GPS almanac data set that every GPS satellite transmits, which includes information about the state of the GPS satellite constellation, as well as course data on every satellite in orbit. The orbital position of each satellite is known as the ephemeris data. This ephemeris data is, effectively, a history of updated orbit reports from the satellites themselves. Automated daily uploads 228-229 provides the raw satellite navigation system data in Receiver Independent Exchange Format (RINEX). Orbit plotting service 225 handles the initial orbit calculations and sends the orbit calculation data needed by risk analysis orchestration 252, in the format specified via API 224.

Continuing the description of GNSS risk analysis architecture 205, GNSS risk analysis engine service (RAS) 125 generates GNSS risk analysis data, via GPU ray casting on FBX data with metadata, and provides the forecast data to GNSS risk analysis orchestration 252 as specified via forecast API 244 via forecast service call back (FSCB). Again, ray tracing is an alternative to ray casting. Management of GNSS Forecasts from administrator and customer side can be done over Internet browser services. A mobile interface could be utilized in another implementation. GNSS risk analysis engine service (RAS) 125 generates GNSS risk analysis data for defined cuboids. Each cuboid has unique ID (GUID). Cuboids get uploaded to GNSS risk analysis CDN 255 using forecast input API 254 via PostGIS software program that adds support for geographic objects to the PostgreSQL object-relational database, in one implementation. CDN 255 provides the 3D risk analysis visualization from GNSS risk analysis orchestration 252 for display with browser visualization 258, via customer API 256. Risk analysis API 244 enables GNSS risk analysis CDN 255 to communicate to GNSS risk analysis engine service (RAS) 125, on-demand requests or other requests for data that CDN 255 was not able to provide to the device, in some embodiments. In summary, GNSS risk analysis architecture 205 delivers GNSS risk analysis, in this example, via content delivery network 255 to a user/customer of the forecasts.

The same CDN can be used to convey additional GNSS Forecast data, on request. When a user makes a request for data, if CDN 255 does not have a specific cuboid in the CDN database, it creates a new entity. If a cuboid with the defined ID is available, the system can add a new time forecast or update an existing one. Cuboids are provided from GNSS risk analysis engine service (RAS) 125. In case of collision, the previous cuboid, in time, will be replaced. A cuboid can be sliced and modified by GNSS Forecast data processor, if needed. The forecast data can be processed prior to sending to the customer in some implementations.

The disclosed GNSS risk analysis engine service (RAS) 125 inputs a map and satellite orbits and outputs a forecast of line-of-sight, non-line-of-sight (LOS/NLOS) plus PDOP for each 1 m². RAS provides the ability to determine probability, ranking, and scoring of LOS/NLOS, out-of-view GNSS satellites in a GNSS obscuration forecast, using historical satellite orbit and atmospheric models from Spirent SimGEN/POSApp and treating each satellite as a transmission point in the sky. The disclosed technology uses a surveyed global 3D map with shape files and digital city maps (DCM) which show the dimensions of buildings, terrain, vegetation, and other obstacles to ray cast between selected points on the map, to determine if each satellite is blocked/obscured by objects in the 3D map that is based on the real world. The disclosed technology uses surveyed maps. Part of the challenge in that is the accuracy/variability of the maps makes this type of calculation more complex. It becomes a probability based on the accuracy of the map, geometries, and point on the map from which you are calculating and then extrapolating to a cuboid of area/space.

Figure 3:
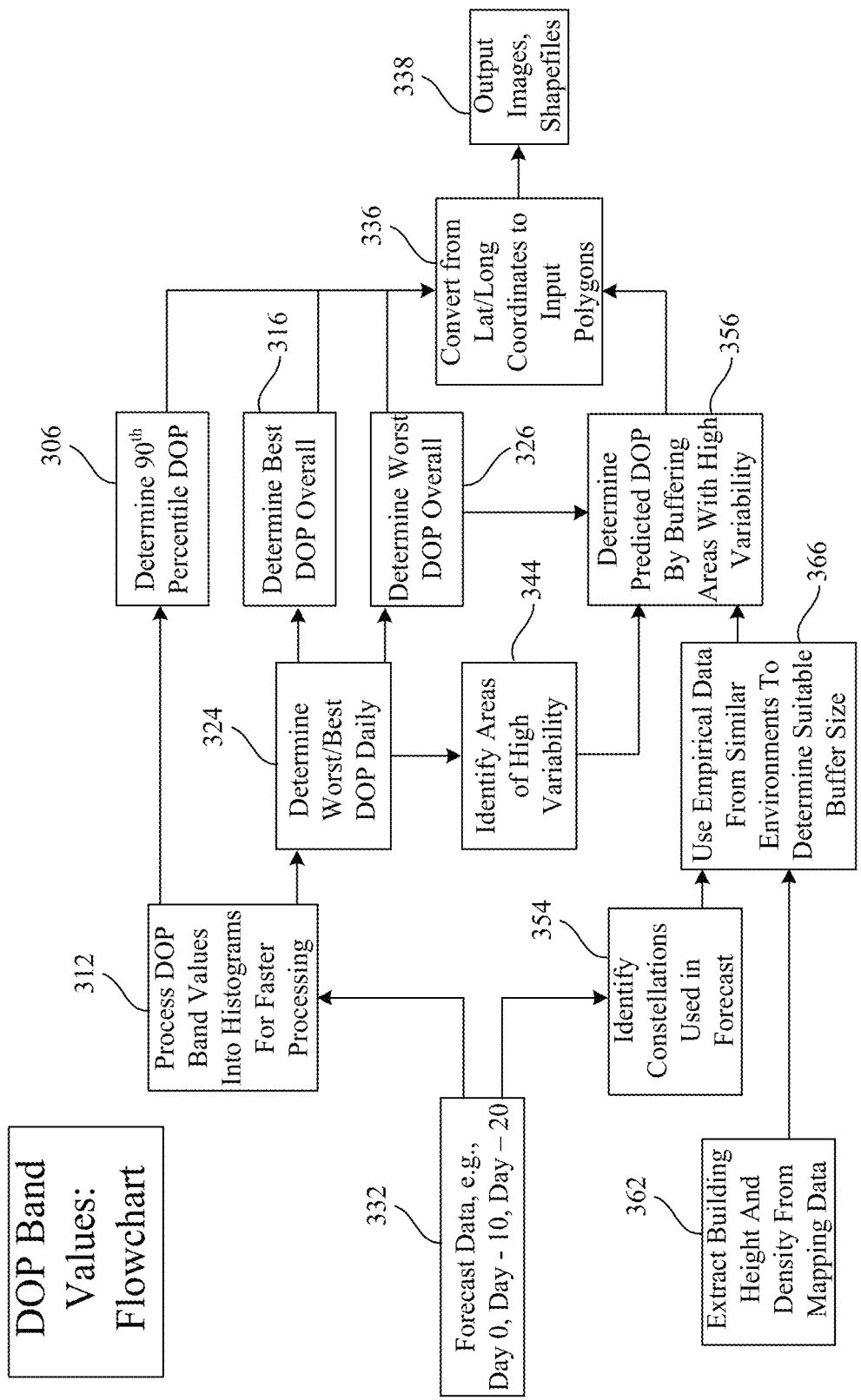
FIG. 3 is a flowchart for risk analysis of DOP band values to determine worst and best DOP values for each day and to determine a $90^{th}$ percentile DOP.
Figure 4:
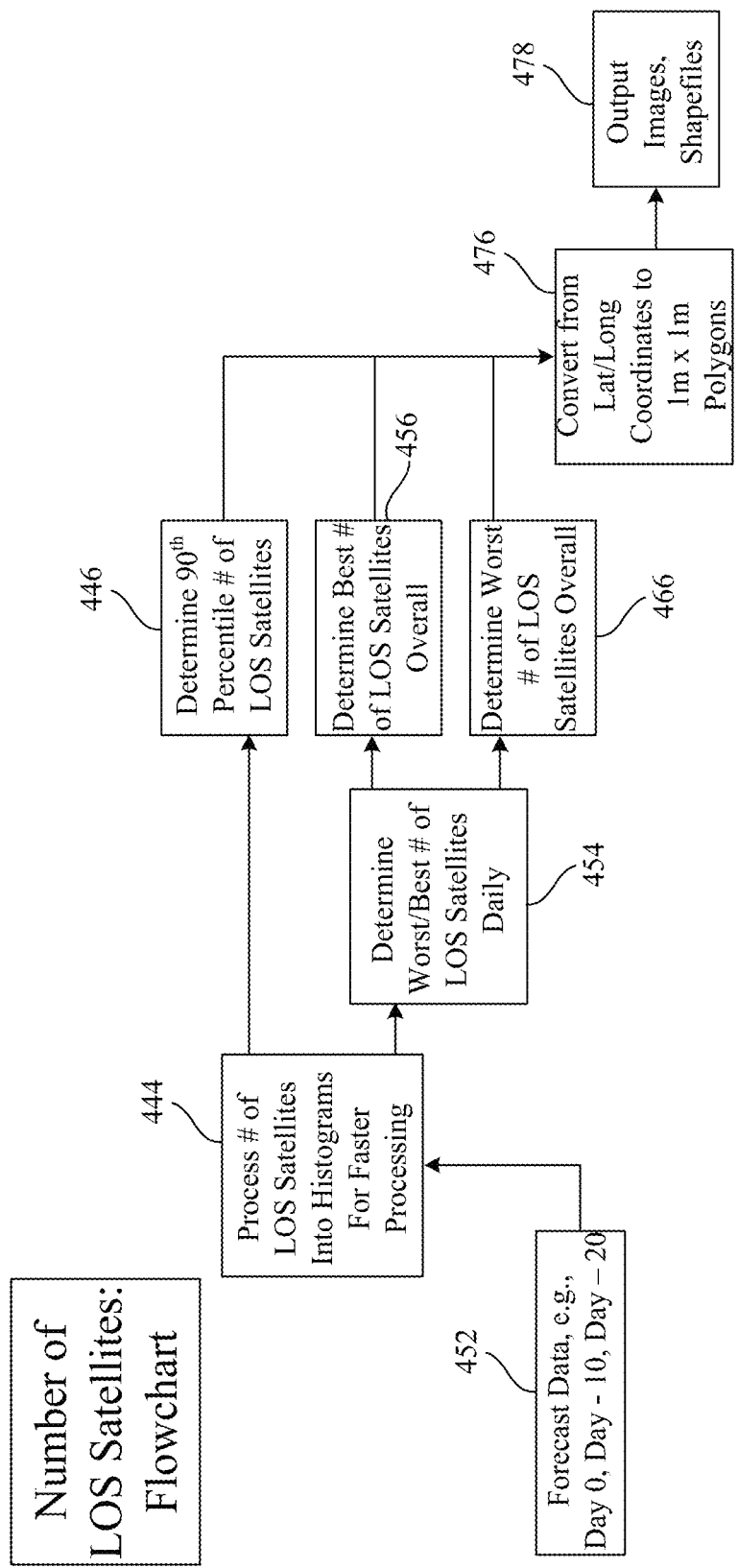
FIG. 4 depicts a flow chart of calculating a number of satellites that have line of sight visibility to a cuboid or polygon.

FIGS. 3-4 are flowcharts of determining risk analysis of DOP band values and number of line of sight (LOS) satellites visible. Details of buffering areas based on variability are provided in FIG. 3 but not FIG. 4. Buffering could also be applied to LOS counts.

FIG. 3 begins at 332 with an example of analyzing three sample days of historical data regarding satellite orbits. This example analyzes a day 0 and two other days, ten and twenty days earlier than day 0. This is an example sampling for analysis.

The example of analyzing days 0, −10 and −20 is not crucial to generating a risk analysis. This span of 20 days was determined by detailed analysis of 200 plus consecutive days to be sufficient to reflect gradual drift in satellite orbits. Extrapolating from the detailed analysis, the parameters for analysis can be adjusted. For instance, a span of 15 days also would be sufficient to prepare a risk analysis, though more of a buffer or more frequent updating of the risk analysis may be needed if a narrower span of days is used. A longer span of days also can be used, with a greater likelihood of capturing a satellite repositioning event in a longer span of days. Long term historical data is available covering years. Extrapolating from the detailed analysis, a span of 365 days or more could be used for risk analysis. A long span inevitably captures multiple satellite repositioning events. Capturing more of these unique events does not enhance the risk analysis, because past repositioning events are unlikely to repeat, and the results of repositioning are well settled by day 0. It has been observed that an individual satellite is unlikely to be positioned more often than once every five years. Samples from three days, for instance, did not need to be separated by 10 days. Extrapolating from the detailed analysis, sampled days could be separated by five to 50 days, for instance. To save on compute, as time marches forward a day, previously computed days −11 and −21 could be reused instead of computing days −10 and −20. It is not necessary that the number of days between sample days be equal. The example sampling pattern includes three days was determined by detailed analysis to be sufficient. Extrapolating from the detailed analysis, sampling of 4, 5 or 10 days could be used for risk analysis. Analysis of six days, with the same frequency of analysis, would take about twice as much computing as three days. The technology disclosed entails a sampling pattern of 3 days or more; it is not expected that 100 or more sample days would be used for ongoing risk analysis, due to compute cost. In the detailed analysis, the sampling frequency within a day was each second. This could be decreased, either to improve computation efficiency or just to reduce compute cost. For instance, sample could be taken each five or ten seconds. Upon detection of a transition, of a satellite becoming visible or invisible, the sampling frequency could be increased to every second, to determine to the second when the satellite appeared or disappeared from LOS. Alternatively, based on extrapolation from the detailed analysis, sampling each five, ten or sixty seconds could be chosen to reduce compute burden. With less frequent sampling as a basis for analysis, the refresh rate of published risk analyses should be more frequent. For instance, the example sampling of days 0, −10 and −20 on a second-by-second basis could be refreshed after four or six months. Less frequent sampling could lead to a weekly refresh rate of published risk analyses.

Continuing with FIG. 3, the DOP analysis can continue 312 with processing DOP value bands on a histogram basis, for faster processing. FIGS. 14-18 illustrate six DOP value bands of 1 or better, 1-2, 2-5, 5-10, 10-20 and >20. Translated into qualitative labels, these PDOP value bands or classes can be described as: "IDEAL" [0-1); "EXCELLENT" [1-2); "GOOD" [2-5); "MODERATE" [5-10); "FAIR" [10-20); "POOR" [20+); "NO_DOP". e.g., "IDEAL" corresponds to a PDOP from 0 to 1, with the rounded training parenthesis indicting that exactly 1 pushes from the ideal into the excellent class. Other or fewer bands could be used, with a threshold between good enough and not good enough being the most important threshold. From the banded analysis, a score of 5 can be used as a predetermined threshold for adequate coverage or a score in a in a of range of 4 to 7. Qualitatively, EXCELLENT and GOOD scores (top two bands) can be used as adequate GNSS coverage. A histogram is a count of instances in which the DOP value band falls into one of the six classes. This simplified distribution of DOP values, in bands, was determined by detailed analysis, to be sufficient for risk analysis. It could be replaced with alternative statistical calculations that require greater computation. Or, only minimums and maximums, or two to twenty minimums and maximums, could be collected. There are many ways to determine various ands.

Processing of DOP values into bands can be used to determine worst and best DOP values for each day 324 and to determine a 90$^{th}$ percentile DOP 306. Output of the worst/best determination 306 can be used to produce a best DOP overall 316, across the days sampled, a worst DOP overall 326, and areas of high variability 344 between DOP values. The worst DOP overall 326 and the areas of high variability 344 can be combined, along with empirical data from similar environments to determine a suitable buffer zone 366, in a buffer area determination 356 that extends worst case areas of inadequate DOP with a buffer zone. This buffer zone reduces risk that when flying along or across a border between adequate and inadequate GNSS coverage, as further explained below in the context of FIGS. 7-8. Input to determination of a suitable buffer zone 356 can flow from the forecast data 332, building height and density map data 362 and identification of satellite constellations used in forecasts 354. The impact of building height on the size of the buffer zone is further discussed below in the context of FIG. 10, image numbers 1050 and 1060.

Supposing calculations are preformed using latitude and longitude values, those coordinates can be converted 336 into cuboids or polygons with unique ids, such as 1 m×1 m polygons. The cuboids or polygons can be output as images or shapefiles 338. Examples of output from risk analysis can be seen in FIGS. 5-8 and 10.

FIG. 4 depicts a flow chart of calculating a number of satellites that have line of sight visibility to a cuboid or polygon. The flow of calculation closely resembles FIG. 3. Not shown is application of buffer zones to a number of line-of-sight satellites, especially between coverage consider adequate and inadequate. The description that follows is adapted from the description of DOP determinations. FIG. 4 begins at 432 with an example of analyzing three sample days of historical data regarding satellite orbits. This example analyzes a day 0 and two other days, ten and twenty days earlier than day 0. Of course, alternative sampling frequencies and patterns can be applied to LOS determination, as explained above for DOP determination. The LOS risk analysis can continue 412 with processing LOS satellite counts on a histogram basis, for faster processing. Optionally, the counts could be assigned to bands of satellite counts, though this may slow instead of speeding processing because visible satellite counts are integers, which can be used to index into accumulator arrays.

Processing of LOS satellite counts can be used to determine worst and best LOS values for each day 424 and to determine a $90^{th}$ percentile DOP 406. Output of the worst/best determination 406 can be used to produce a best LOS overall 416, across the days sampled, a worst LOS overall 426, and (not shown) areas of high variability between LOS values.

Again, supposing calculations are preformed using latitude and longitude values, those coordinates can be converted 436 into cuboids or polygons with unique ids, such as 1 m×1 m polygons. The cuboids or polygons can be output as images or shapefiles 438. Output from LOS risk analysis can be seen in FIGS. 5-8 and 10.

Figure 5:
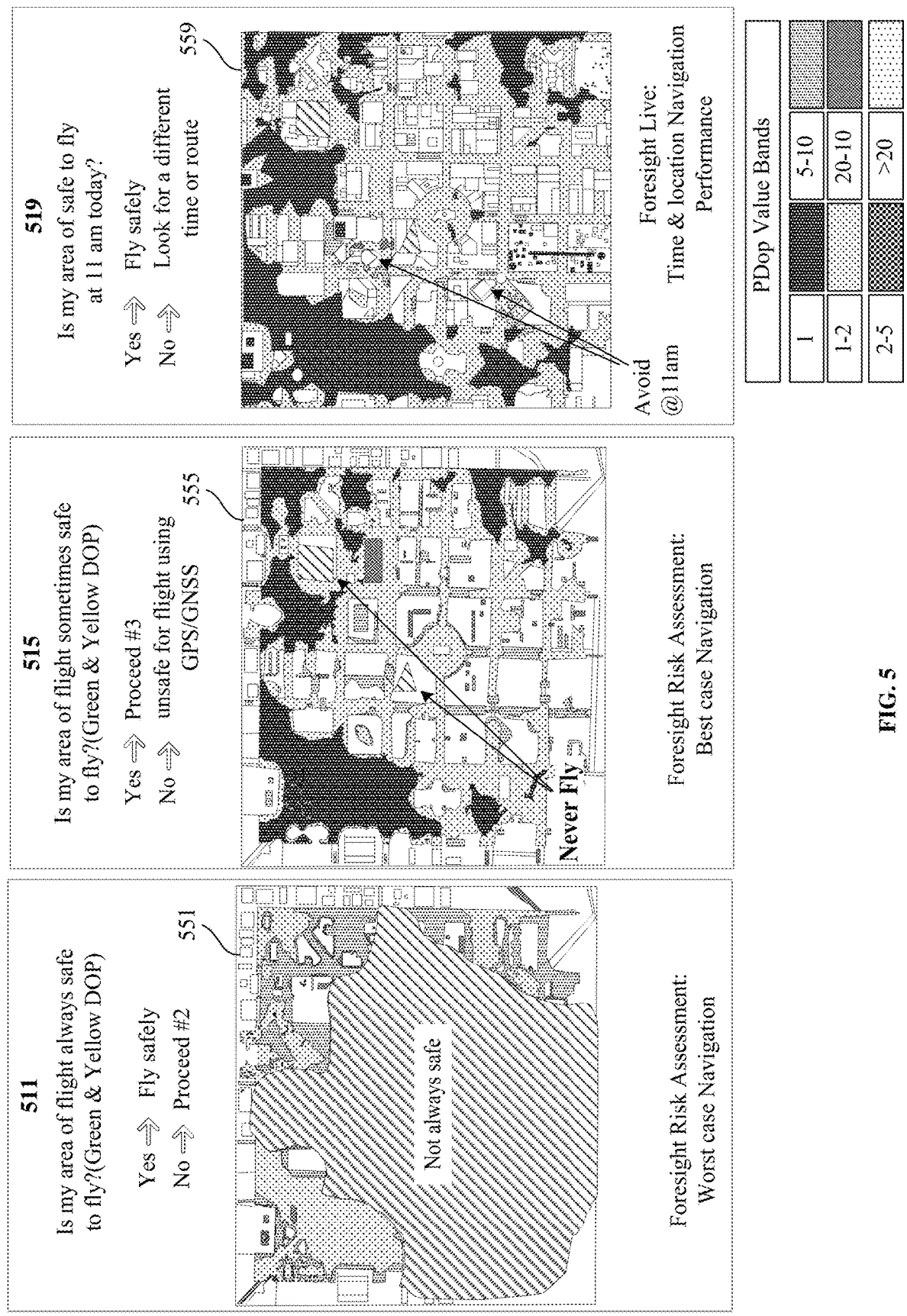
FIG. 5 depicts how best- and worst-case DOP risk analyses can be used with forecast data to route a drone.

FIG. 5 depicts how best- and worst-case DOP risk analyses can be used with forecast data to route a drone. Analysis progresses through the questions: is my area of flight always safe to fly 511? Is my area of flight sometimes safe to fly 515? Is my area safe to fly at 11:00 AM today 519? In the worst-case analysis, green and yellow DLP areas are always safe to fly. All other colors of areas in a worst-case analysis are not always safe to fly. in image 551, the crossed hashed area is not always safe to fly. When both the starting position and destination are safe to fly and there is a connecting route, the route can be plotted using just the worst-case risk analysis. If a route cannot be plowed based on the worst-case risk analysis, analysis can proceed to the best-case risk analysis. In the best-case analysis numeral 555, only small crosshatch areas are indicated as never fly zones. Assuming that the starting point and destination are outside the never fly zones, prediction data can be obtained to find a safe time to fly or to schedule a route at a particular time. The forecasting technology previously disclosed can be used to generate a series of snapshots 559 for a selected time span, either literally or in prediction data with associated times. A route can be plotted using this granular forecast data.

Figure 6:
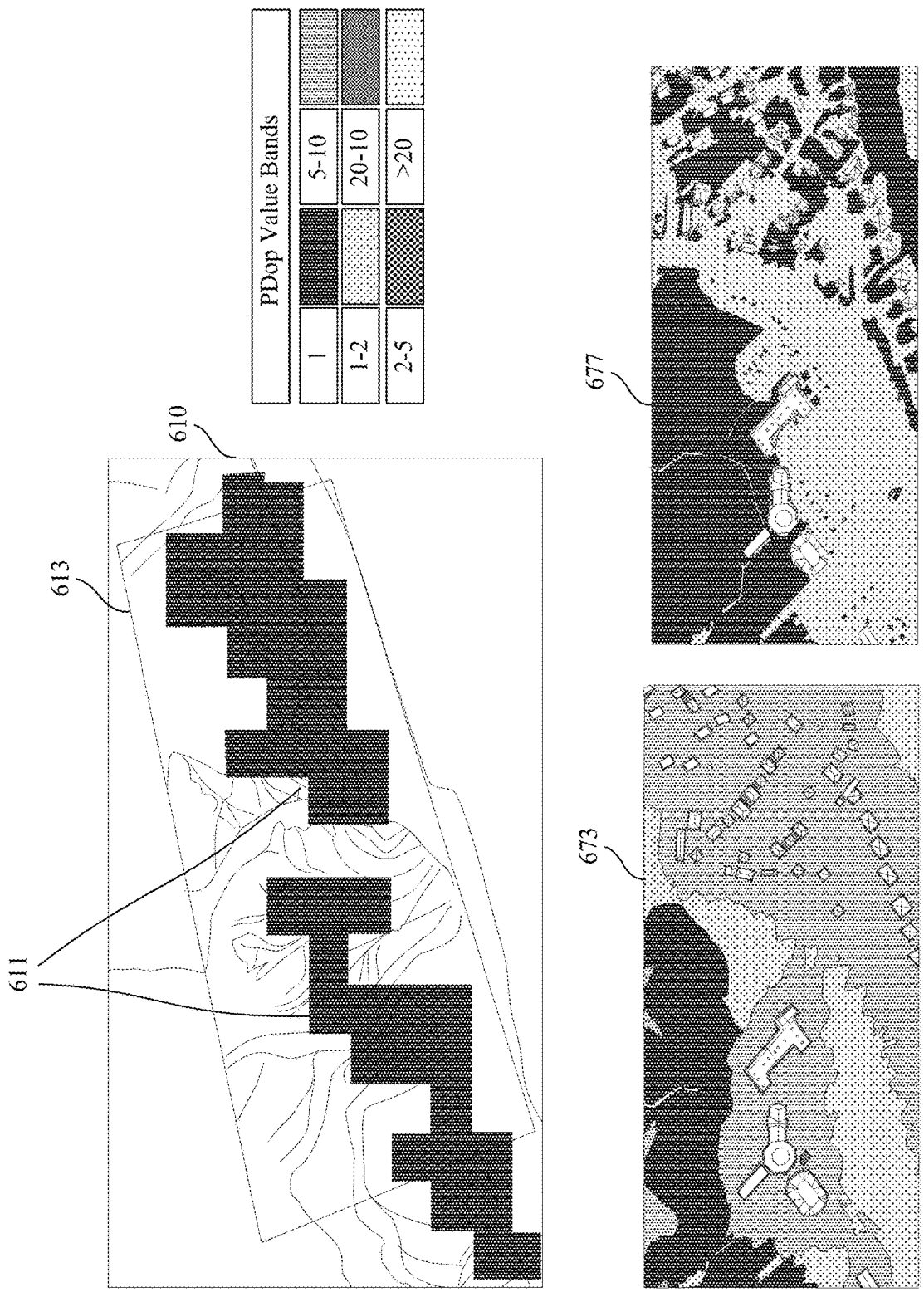
FIG. 6 illustrates analysis applied to the coast of North Carolina.

FIG. 6 illustrates analysis applied to the coast of North Carolina. This section of the North Carolina coast is largely rural. In image 610, the regions that were analyzed 611, within the boxed area 613, passed the worst-case analysis and qualified as always fly zones. However, small areas surrounding structures and trees may nonetheless lack adequate GNSS coverage, as illustrated in images 673 and 677. The images at the bottom of FIG. 6 illustrate worst case 673 and best case 677 risk analysis for an area with 20 or so homes and three larger structures. In the worst-case analysis 673, the only areas that fail to qualify as always fly zones are near structures. Most of the structures are surrounded, in the worst-case analysis, by small zones of inadequate GNSS coverage. In contrast, the best-case risk analysis 677 shows that a good place to land a drone is available at some time for all the structures. Depending on how close a package drop off needs to be to a structure, forecast data can be requested and used to find a good drop off time.

Figure 7:
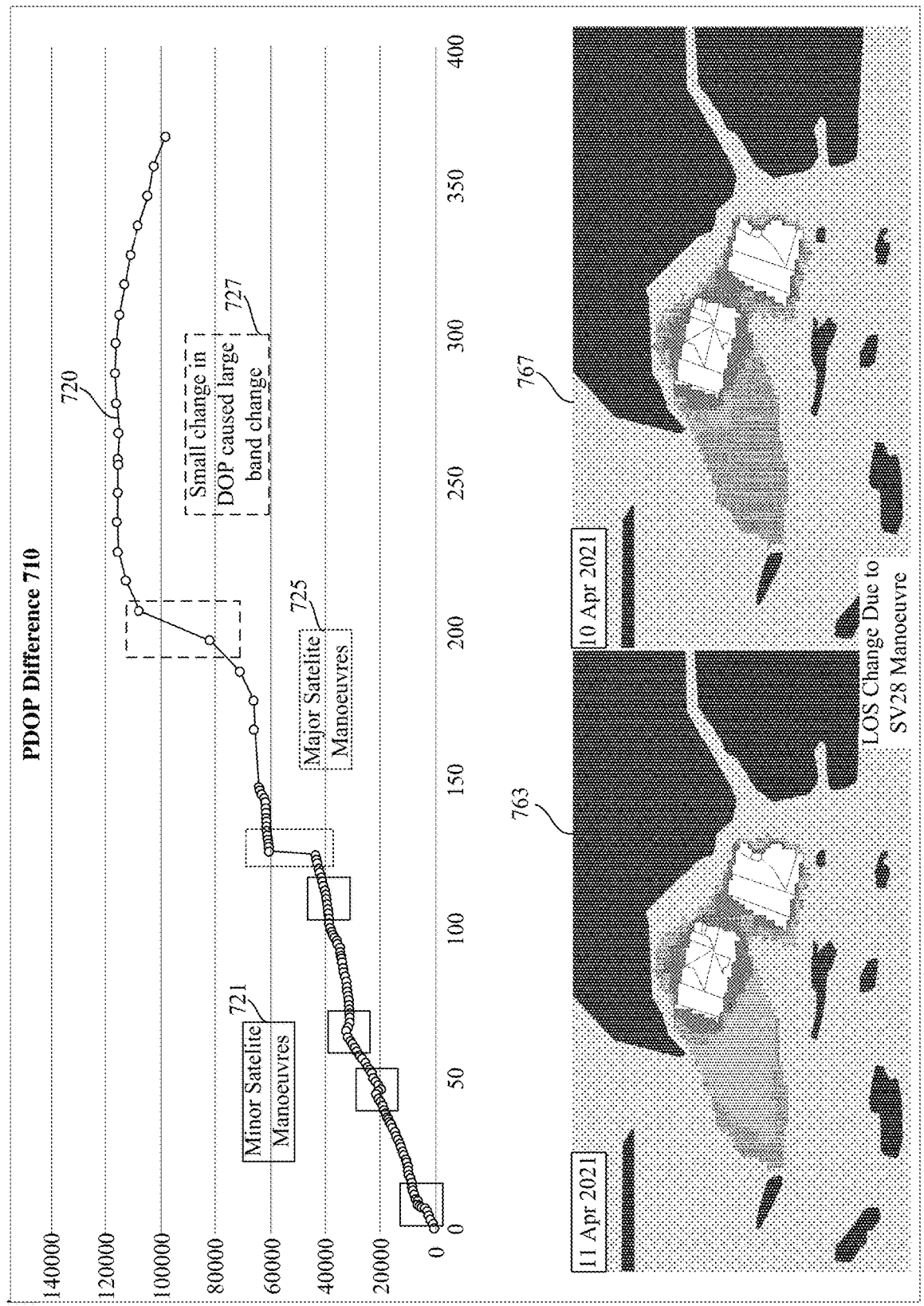
FIG. 7 illustrates a sample analysis of how long a worst-case risk analysis remains reliable, when derived from data for days 0, −10 and −20.

FIG. 7 illustrates a sample analysis 710 of how long a worst-case risk analysis remains reliable, when derived from data for days 0, −10 and −20. Three features of the plotted line 720 are minor satellite maneuvers 721, a major satellite maneuver 725 and a small change in DOP 727 that resulted in shifting many points of analysis from a band with adequate GNSS coverage to an inadequate coverage band. Four minor satellite maneuvers are shown in boxes. Two of them decreased DOP reliability and two increased reliability.

The FIG. 7 graph is based on analysis of approximately 900,000 points of reference in a region that are potentially different from a day 0 worst case risk analysis. The horizontal axis represents a number of days away from day 0, the starting date for preparation of the graph plot. Because this is historical data, negative relative dates give the number of days before day 0, through a year before day 0. The vertical axis represents the number of points of analysis, among the 900,000 points, that changed in the span of days on the X-axis.

The FIG. 7 graph shows that at 50 days, about 20,000 points out of 900,000 were different than in the reference worst case risk analysis for the region. At day 130, the number of different points jumps from about 42,000 to 60,000. This was the result of major satellite maneuver 725. A second major increase in the number of changed points took place between days 200 and 225. The number of changed points increased from 70,000 to 110,000. This change was attributed, by analysis, to a small change in DOP 727 that moved a large number of points from an adequate coverage band to an inadequate coverage band. Corresponding to major satellite maneuver 725, images 763 and 767 illustrated the changed GNSS availability between Apr. 10 and Apr. 11, 2021, for the area illustrated. The shadow 773 of the left-hand building in these images is larger 773 on April 11 than it is 777 on April 10. Most of the solid shadow 773 changes to dotted differences 777 from April 11 to 10.

The technology disclosed can be configured to watch for satellite maneuvers, either in orbit data reported from the satellites or in data produced by a daily risk analysis of data. The orbit data from satellites is more efficiently analyzed to select days on which worst- and best-case analyses should be refreshed. Risk analysis can be refreshed whenever a major satellite maneuver is apparent in the reported data. Or risk analysis can be partially performed to evaluate whether a full, out of schedule refresh of a published risk analysis should be performed. If there is a really big change from one day to the next in DOP, 1½ to 2 percent change. Or, a large change from the start to the present, e.g., change in DOP of 5 percent. Then, update risk analysis out of cycle, early.

Figure 8:
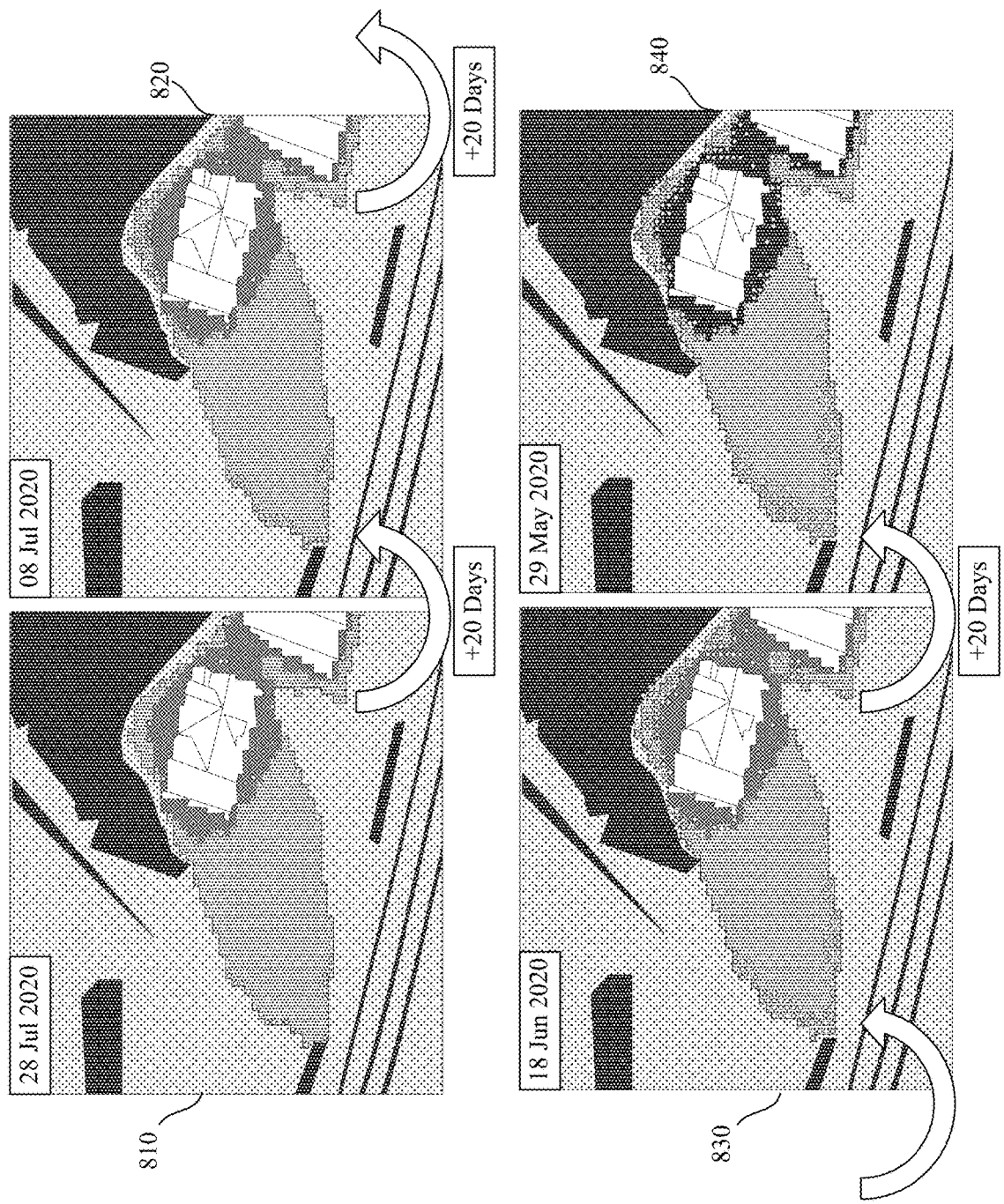
FIG. 8 depicts worst case analysis based on five days separated by 20-day intervals.

FIG. 8 depicts worst case analysis based on five days separated by 20-day intervals. The linear behavior of graph 710 can be understood by considering images 810, 820, 830 and 840. These images show a heat map that overlays data from Aug. 16, 2020, with points from four worst case risk analyses calculated at 20, 40, 60 and 80 days prior to August 16th. White dots show a change of one band (see, e.g., legends in FIGS. 14-17) in DOP value. Light blue dots show a change of two bands. Dark blue darts show a change of three bands and black is four bands. Dots are used to indicate cumulative changes between August 16$^{th}$ and the date indicated. The dots in 810 appear in 820-840, with more dots added to successive image panels. Colors are used to indicate the worst case on August 16th. In the majority of areas, reduced DOP, as compared to open sky conditions, is caused by loss of line of sight to one or two satellites. The performance in areas near structures is highly sensitive to the location of a few satellites. Here, the images show a linear progression of points with different DOP near the structure, corresponding to elevation angle for a key satellite that is slowly decreasing over weeks.

Figure 9:
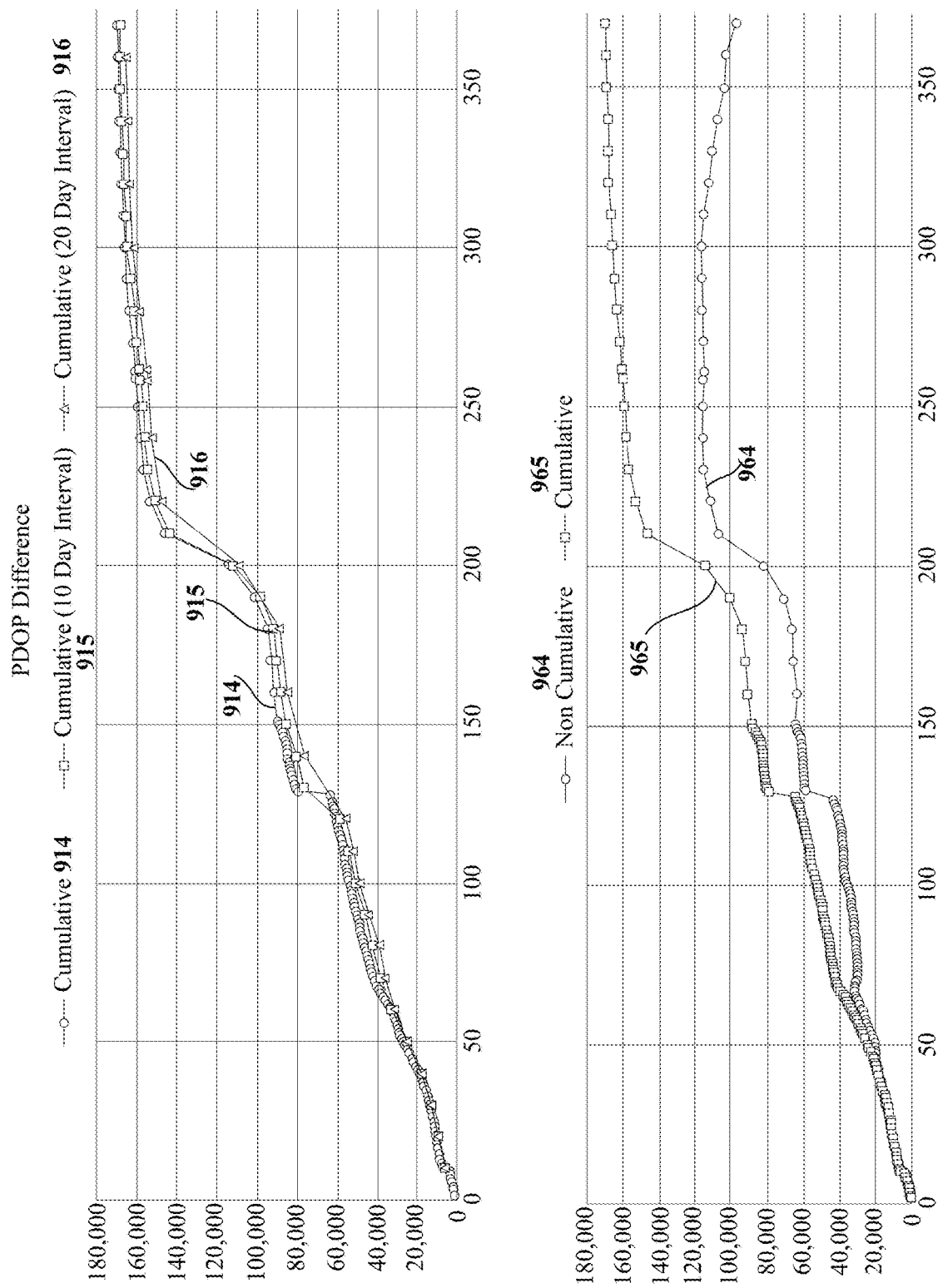
FIG. 9 illustrates cumulative and noncumulative calculation of differences in DOP

FIG. 9 includes graphs 910 and 960. The first graph 910 depicts cumulative PDOP differences, with accumulation at one day (914), 10-day (915) and 20-day (916) intervals. The one-day accumulation is nearly linear, excepting sudden jumps that correlate to satellite maneuvers, as discussed above for graph 710. Graph 910 shows that there is more than a 99% match between day 0 and daily worst case risk analyses for the first 18 days. The match is greater than 95% for days 19 through 88. There is a greater than 90% match even for days 89 through 180. Nearly identical information can be extracted by considering the cumulative count of PDOP differences calculated on 10- or 20-day intervals instead of every day. The similarity regardless of calculation interval is due to linear change in satellite orbits. The majority of difference between daily cumulative count and 10- or 20-day cumulative count is caused by satellite maneuvers. The satellite geometry is changed by a maneuver, which can be immediately accounted for in a daily count. It cannot be recognized in a 10- or 20-day cumulative count until several days after the maneuver, due to smoothing. Based on one day differences, a maneuver could be recognized, and a forecast immediately refreshed, when the maneuver is highly significant. Still, a maneuver of a particular satellite vehicle is unlikely to be repeated between refreshes of a risk analysis, as satellite maneuvers are separated over a scale of years, such as once every five years.

FIG. 9 also includes graph 960, which illustrates the difference between cumulative 965 and noncumulative 964 calculation of differences in DOP between day 0 and an earlier day. During the initial 50 to 75 days, the count of cumulative DOP difference is nearly identical to that of noncumulative DOP difference. This means that there is significant overlap between the set of points with different DOP on one day versus the next. If a point has a different DOP on day n, it is highly likely to have the same different DOP on day n+1. The cumulative and noncumulative counts diverge after the first few satellite maneuvers, which cause significant changes in DOP from one day to the next. Over time, the cumulative count accumulates outdated satellite geometry due to maneuvers. Therefore, the cumulative count tends to overstate likely differences not caused by maneuvers. A system that monitors occurrence of maneuvers, can effectively use noncumulative DOP calculations for risk analysis, with some savings of compute.

Figure 10:
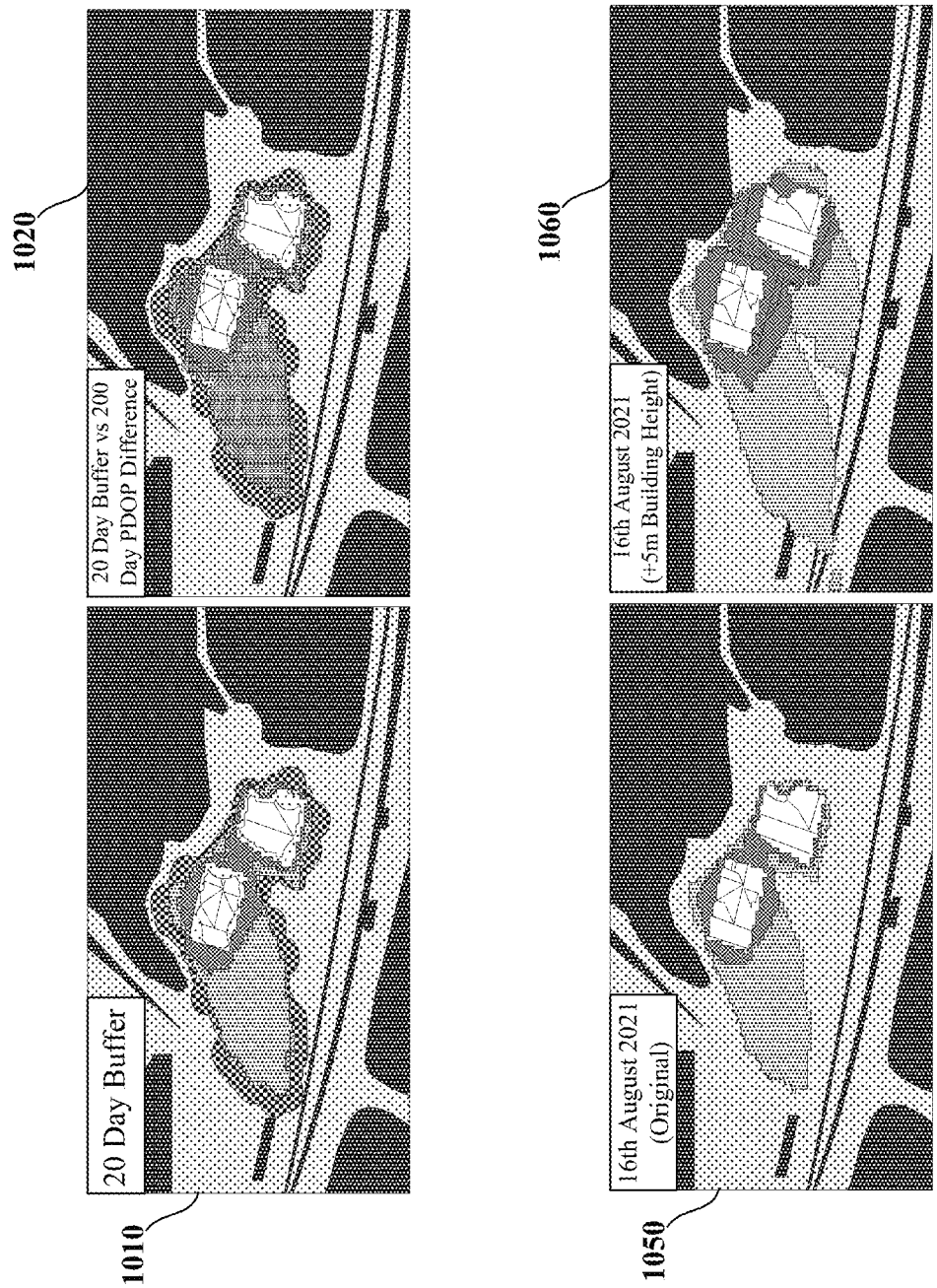
FIG. 10 illustrates buffers and effectiveness of buffers in protecting against DOP differences over a 200-day interval.

FIG. 10 includes a pair of images 1010 and 1020 illustrating buffers and effectiveness of buffers in protecting against DOP differences over a 200-day interval. One feature of image 1010 is the white dots that are separated from one another. Buffers are extended zones, indicated in light orange, in which the worst-case analysis restricts flying and requires further analysis. Flight in a light orange buffer zone is intended to be processed following the progression in FIG. 5. The buffer in 1010 is larger around white dots than at the edge of the dark orange area. In this illustration, the buffer is 4 meters around a white dot and only 1 meter from an orange area edge that does not have a white dot. Hence, the irregular shape of the buffer zone.

FIG. 10 also includes a pair of images 1050 and 1060 illustrating how tall are buildings have larger create larger shadows of inadequate GNSS coverage. The worst case in analyses for Aug. 16, 2021 of the original building is shown in 1050. Increasing the height of the building causes an increased no fly zone as shown in 1060. Accordingly, a larger buffer can be provided for a tall building. For instance, a 4-meter buffer is used for a building 7.25 meters average height, then a 7-meter buffer may be appropriate for a building 5 meters taller, 12.25 meters on average. Buffer zones of two to ten meters work well. Based on the data analyzed here, these buffers produced good results through 180 days, until the satellite maneuver that moved a significant number of points from one band to another.

The additional FIGS. 11-18 described in the following section are repeated from our prior patent application, to reduce the need for review of materials incorporated by reference.

Figure 11:
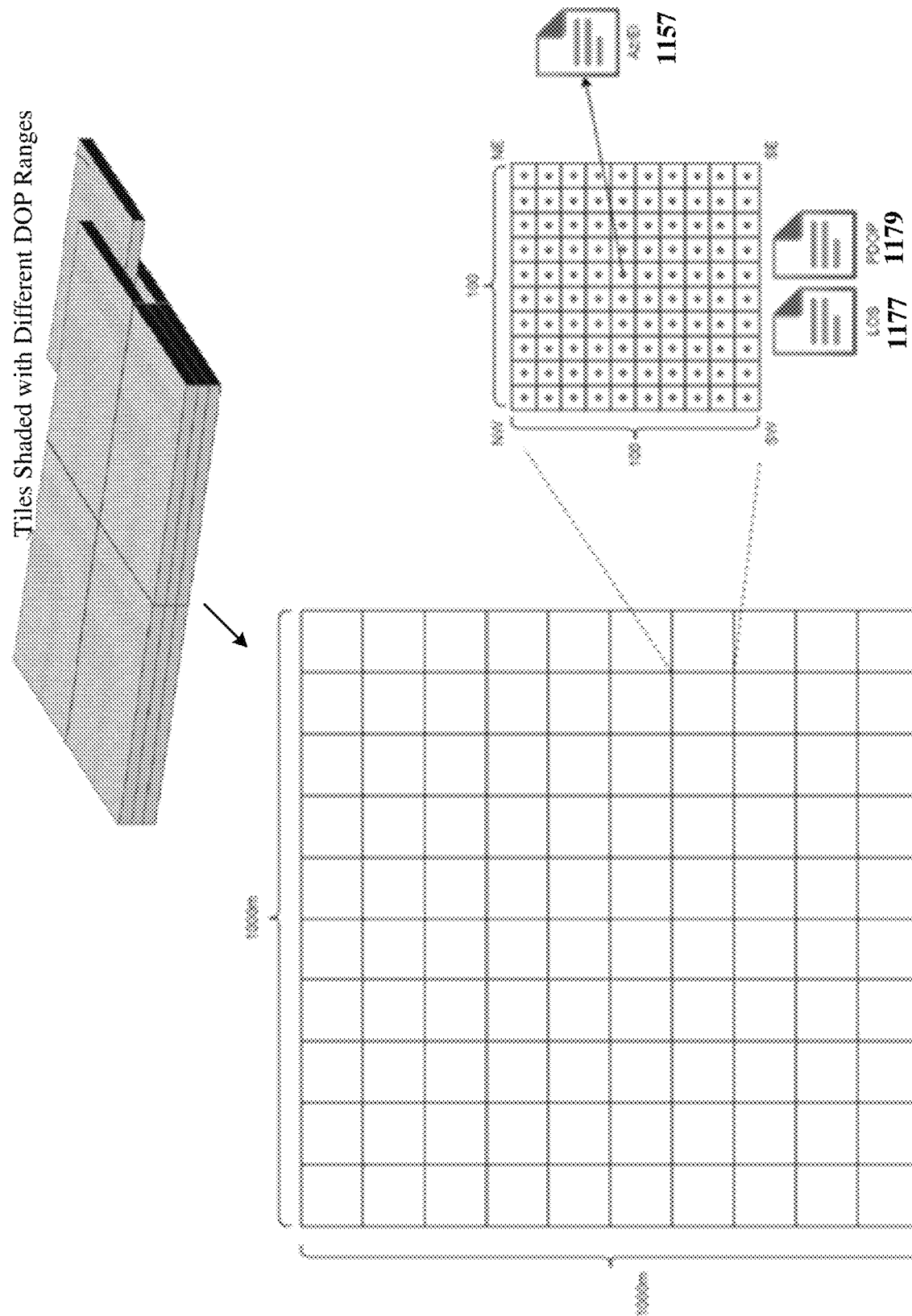
FIG. 11 shows a sketch of a stack of shaded tiles and an example 1 $Km^2$ output buffer of FES.

FIG. 11 shows a sketch of a stack of shaded tiles and shows an example 1 Km$^2$ output buffer of RAS 1158, with the Azimuth/Elevation 1157, LOS 1177 and PDOP 1179 data for each 100×100 m area. Each RAS output file can contain a tiles worth of data for best-case and worst-case risk analyses. In one implementation with each LOS file estimated to be in the range of 50-60 MB in size. For a 1 Km$^2$ area at 1 m resolution to be refreshed after 4 to 6 months, the size is approximately 5 GB. For an example, scaled up to 6000 Km$^2$ the size is approximately. The size of risk analysis data files motivates compression.

Compression of GNSS Forecast data can be segmented into three types of compression: spatial, temporal, and mathematic compression. Disclosed compression-related parameters are described for the DeviceAPI.proto files above.

Spatial compression analyzes each cuboid or point in the GNSS point cloud based on location. Spatial compression analyzes the similarities and differences of the data of one cuboid to the cuboids around it, in a way that is similar to the way a video pixel is compressed based on the pixels around it (left, right, above, below, etc.). If the data in the adjacent or nearby cuboids is the same or similar, compression can be applied. A lossless compression searches for identical cuboids, encodes one fully with all the data, and then cuboids with the same data point to the reference cuboid with the full information. A lossy compression method applies a threshold to look for cuboids that have small differences relative to the reference cuboid, determines that the difference is not inconsequential to the user and points those cuboids to the reference cuboid. Another compression method changes the size of the cuboid to cover a larger area instead of using pointers. As an example, if a 1-meter cubed cuboid (1 m×1 m×1 m) has the same or similar data as three adjacent cuboids, the system can change the size of the cuboid to cover the total area with one data set. That is, the size of the cuboid would be changed to 3 m×1 m×1 m).

Spatial compression can be complemented by using different resolutions in different environment types. An urban canyon may require 1 m resolution, while a rural area may use 3 m resolution or non-cuboids, such as 3 m×3 m×10 m or 5 m×5m×100 m or 10 m×10 m×1000 m or in any range that includes any of these resolutions.

Temporal compression analyzes each cuboid or point in the GNSS point cloud based on location and time. Temporal compression analyzes the similarities and differences of the data of one (or more) cuboid(s) over time. If the data of one or more cuboids are the same or similar over multiple time periods, compression can be applied. Either lossless or lossy compression can be used. A lossless compression, for instance based on run length encoding, looks for cuboids that do not change over multiple time periods, encodes one fully with all the data and then cuboids with the same data point to the reference cuboid with the full information. A lossy compression method, with banding or quantization, applies a threshold to look for cuboids that have small differences to the reference cuboid, determines that the difference is not inconsequential to the user and point those cuboids to the reference cuboid's time period and data. Another compression method changes the valid time period of a cuboid to cover a longer time instead of using pointers. As an example, if a 1-meter cubed cuboid (1 m×1 m×1 m) valid for one second has the same or similar data to the same cuboids over the next 29 seconds, a single cuboid and data can be stored with a 29 second valid period instead of 1 second valid period.

Spatial and temporal compressions can be combined to compress based on the similarities and differences of cuboids over the forecasted area and time. For example, a cuboid in one location and time can be the same as another cuboid in a different location and time. These cuboids can be compressed as a reference to an original cuboid and how it moves over time, in a way similar to methods used in video compression.

Mathematic compression looks at patterns in the data with or without reference to temporal or spatial information. Similar patterns are mathematically compressed. Hashes compress similar data mathematically. For instance, if there is a common combination of data such as satellite positions, visibility, DOP values, etc., these can be hashed and compressed.

GNSS risk analysis data flows from a cloud-based engine to GNSS CDN to a wireless carrier in one scenario. The data flows from GNSS CDN to USS/AV service in another scenario. In one example for data size analysis, GNSS risk analysis engine service (RAS) 358 generates approximately 4.1 PB raw data and transfers via Serial AT Attachment (SATA) at 400 Gbps to forecast storage approximately 1 PB primary data, transferrable to GNSS CDN 369, resulting in approximately 100 TB compressed data in a week. For a day's worth of data, at 400 Gbps that is 44.4 minutes. At 10 Gbps that is 29.6 hours. GNSS CDN 369 transfers data to wireless carrier at approximately 1 MB per KM, with bursts along the route. Similarly, GNSS CDN 369 transfers data to USS/AV service at approximately 10 MB compressed data per request. At one Gbps, transmission time per request is approximately one second.

FIG. 12 illustrates a 2D cross-section of orbits of four GNSS satellites, and an example error calculation for a point at which the receiver is located. In a typical situation in an urban area, the reception of each satellite signal depends on the position of the receiver and the satellite with respect to each other. Satellites S2 1244 and S3 1246 are in line of sight (LOS) with point 1265. Satellite S4 1258 is blocked and satellite S1 1252 has non-line-of-sight (NLOS); that is, S1 1252 utilizes multipath signals that reach the receiving antenna by two or more paths. Causes of multipath include atmospheric ducting, ionospheric reflection and refraction, and reflection from water bodies and terrestrial objects such as mountains and buildings. Positioning and navigation can be degraded in urban environments by multipath, and the error can increase considerably if not properly compensated. In situations where the line-of-sight (LOS) is obscured by surrounding buildings, the receiver may still be able to navigate by using the non-line-of-sight (NLOS) signal, which originates from single or multiple reflections/diffractions of the GNSS signal. The use of 3D models has been one of the preferred solutions to recreate the multipath environment as seen by a GNSS device. This solution brings the capability to generate a multipath signature that is representative of the position of the antenna in a specific time and space. For the given point 1265, a +/−3-meter error in the map data yields an error of 7.85 minutes in the determination of a GPS satellite being line-of-sight or not line of sight. Over a forecast period of 180 minutes this would provide a confidence interval of 96%. For risk analysis, multipathing need not be considered. This simplification allows use of ray casting instead of ray tracing, which could alternatively be used, with increased compute requirements.

API Use Cases

For various use cases, risk analysis service APIs cover multiple scenarios described next.

In one scenario, a route planner knows starting points and destinations and wants to know with high-fidelity, whether the route is assured of having adequate coverage, while minimizing use of detailed forecast data for planning. For aviation, the planner additionally needs to learn the positioning error of a UAS flight path/volume for planning or surveillance. Using a worst-case risk analysis, potential routes can be scouted and if one is satisfactory, it can be selected without requesting detailed forecast data. If no route is selected based on worst-case risk analysis, a best-case risk analysis can be analyzed. When a route is identified from the best-case risk analysis, the customer can download the complete route for an identified time period and pick a transit time that is clear. DOP and #sat (LOS, NLOS, NA) can be utilized to determine when the route is good, for a navigation system, planning, and for USS. If all routes are deemed to be not "good enough", based on either the best-case risk analysis or the detailed forecast data, an alternative vehicle (not a flying vehicle) may need to be used.

Path Planning

The disclosed technology for GNSS Forecasts can be applied to path planning for ground-based vehicle fleets, in one use case. Autonomous and automated vehicles use a variety of sensors to determine the relative position of the vehicle to its surroundings, sometimes called localization. GNSS is typically the primary method of determining absolute position and time with respect to the surface of the earth, or geodesic reference, and time (Universal Coordinated Time(UTC)). The reliance of the vehicle on GNSS makes it very important or critical to the operation of the vehicle. GNSS Receiver performance can be enhanced using RTK (RTK, PPP, & RTK+PPP), WAAS, SBAS, GBAS, and RAIM technologies and services. While these techniques improve the performance of GNSS, none of them provide geospatial awareness information about the localized environmental impacts on the GNSS signals from buildings, vegetation, terrain, and other sources of obstructions and multipath.

Using a GNSS risk analysis and the route planning progression in FIG. 5, a planner can route an autonomous vehicle to ensure that it has adequate GNSS coverage over the path and transit time. This is not limited to on-road vehicles like cars and trucks or even drones. This can be used in mining to determine where best to operate machinery based on GNSS risk analysis. In one example, a best-case analysis might lead to mining on one part of the mine, where coverage is adequate in the morning, at 9 am versus mining on another part of the mine at 10 pm. The GNSS risk analysis can also be used to determine the impact of the change in the environment due to blasting/mining.

GNSS environments for any vehicle at ground level or low altitudes are highly dynamic. Traversing complex GNSS environments only minutes ahead or behind the planned time of travel can have a major impact on the GNSS performance. A vehicle traversing through an intersection in a dense urban environment ten minutes earlier can result in 'okay' or safe GNSS signals rather than poor signals.

Aviation Use Cases

In one aviation use case, a drone flying needs to know the expected GNSS signals on its route of travel, or area of operation, for safe navigation. This is especially important for Beyond Line of Sight of the pilot (BLOS), including package delivery or inspection. In order to determine if safe navigation using GNSS is possible, a risk analysis and analysis progression as in FIG. 5 can be used to determine the best flight path (including altitudes), take-off and landing areas, areas to hover or loiter, risk-ratio of the flight, if areas of poor GNSS can be traversed using mitigation techniques and for how long. In some cases, a drone may use certified avionics, like those certified using Federal Aviation Administration (FAA) Technical Standard Order (TSO)-C199 for Traffic Awareness Beacon System (TABS). The certification requires the system to achieve specific levels of positioning performance, like section A1.2.6.3 requires 30 meters horizontal position error with a HDOP of 2.5 or less. The disclosed hybrid solution can be used to determine if the flight path or area in which a drone is going to be flown in the future will have the required DOP, resulting position accuracy, and compliance in operation. Similar positioning requirements exist within FAA remote identification rules.

In order to access a GNSS risk analysis and forecast, the drone, flight planning software, ground control software, Unmanned Service Supplier (USS), or Unmanned Traffic Management (UTM) system connects to a cloud service to request the GNSS signal risk analysis and/or predictions along the intended route, area or operation, or an area where a route needs to be determined. The cloud service processes the request from its distributed architecture to get the appropriate forecast information for the drone and supporting systems and transmits it to the drone and supporting systems. The cloud architecture interfaces with a GNSS risk analysis and/or Forecast engine that gathers satellite data, environmental data, and maps to process with various algorithms to provide a prediction and then publishes the prediction on a cloud architecture. The drone is then able to determine the GNSS signal quality along its route and determine if the route can be flown safely.

In another aviation use case, GNSS risk analysis and the process in FIG. 5 can be applied to flight planning and operation. GNSS is typically the primary or only way for aircraft to determine their global position. In order for the aircraft to navigate, an aircraft may use GNSS to comply with performance-based navigation requirements, report its position using Remote ID or ADS-B, communicate position as a part of air traffic control or unmanned traffic management, detect and avoid other aircraft, avoid obstacles, take-off, land, and even have stable flight. Therefore, it is critical for aircraft to predict the performance of GNSS when planning for a flight and use the same information in flight when making real-time decisions. For manned aircraft, Wide Area Augmentation System (WAAS) and RAIM (Receiver Autonomous Integrity Monitoring) can be used for many of these needs, but that assumes the GNSS receiver has an unobstructed view of the sky with no impacts of single obscuration or multipath. Moreover, these techniques may not meet the accuracy needed for an Unmanned Aerial System (UAS) or Urban Advanced Air Mobility (AAM) system or be geographically specific enough. Moreover, while these techniques improve the performance of GNSS, none of them provide information about the localized environmental impacts on the GNSS signals from buildings, vegetation, terrain, and other sources of obstructions and multipath.

Unmanned Traffic Management (UTM), including the Unmanned Service Supplier, can use the disclosed GNSS Risk analysis and process in FIG. 5 as a part of determining a route, the drone's total system error, performance monitoring of flights, how it allocates airspace, route authentication and route surveillance. UTM can also use the risk analysis and process in FIG. 5 in real-time to monitor the performance of its navigation system and use the risk analysis and process in FIG. 5 for any real-time changes in flight paths. For example, if a change of flight path is made, the UTM could ensure it does not fly into an area that would degrade its ability to fly.

The disclosed GNSS Risk analysis and process in FIG. 5 can also be provided as a Supplemental Data Service Provider (SDSP) as a part of an UTM.

The disclosed GNSS Risk analysis and process in FIG. 5 can also be used to determine the navigation capabilities and requirements of the airspace. For example, a GNSS Risk analysis and process in FIG. 5 can be used to dynamically create geofenced areas and ensure their enforceability. A GNSS Risk analysis and process in FIG. 5 can be determined to determine what type of RNAV/RNP requirements are applicable for a flight. A GNSS Risk analysis and process in FIG. 5 can be used to create static or dynamic flight corridors.

The disclosed GNSS Risk analysis and process in FIG. 5 can be used to select locations for, flight paths to/from, and certify vertiports for electric vertical takeoff and landing (eVTOL) and Advanced Air Mobility aircraft/services.

The disclosed GNSS Risk analysis and process in FIG. 5 can be used to determine areas of consistently high or low risk over long time periods. For example, a GNSS Risk analysis and process in FIG. 5 could be done over a month-long period to determine areas where GNSS signals are available 95 or 99 or 99.9999% of the time. These areas could be classified as low risk for flights. Whereas areas that do not meet those criteria could be classified as dynamic, high risk, and therefore either flights are not allowed in those areas, or a discreet risk analysis and process in FIG. 5 is needed for the exact time and location of the flight to determine GNSS performance.

The disclosed risk analysis system (RAS) technology also includes the methodology of collecting and recording for playback network connectivity as a function of location, altitude, and flight envelope, via a GNSS signal record and playback system such as Spirent GSS6400 product. Network Connectivity is the primary or only way for Unmanned Aircraft (UA) or Unmanned Aircraft System (UAS) to report their global position. In order for the UA to navigate, comply to performance-based navigation requirements, report its position (using Remote ID or ADS-B), communicating position as a part of air traffic control or unmanned traffic management, correctly gather data, deliver packages, avoid other aircraft, avoid obstacles, take-off, land, and even have stable flight. An aircraft may use Network Connectivity to communicate to USS (UAS Service Supplier), UTM (UAS Traffic Management), and Operator and also be used for command and control (C2) especially when operated BVLOS (Beyond Visual Line of Sight). Therefore, it is critical for aircraft to know in advance the performance of Network Connectivity when planning for a flight. For terrestrial vehicles, the cell tower antennas are designed to ensure adequate ground coverage. This is not the case as a UAS gains altitude and may be operating off of a side lobe, resulting in over-propagation and having many more interference effects.

Visualizations that illustrate route planning and evaluation examples that utilize DOP forecasts for GNSS navigation are described next.

Visualizations

As an alternative to distributing forecast data to and via the content delivery network (CDN) service 158, the data can be used to render disclosed visualizations of the forecast. GNSS signals change in urban environments, as is viewable via a map, by altitude and over time. Users can search for a route with "good" GNSS coverage, using the disclosed GNSS Forecasts described herein. Users can visualize GNSS performance around a known route and adjust if needed.

Figure 13:
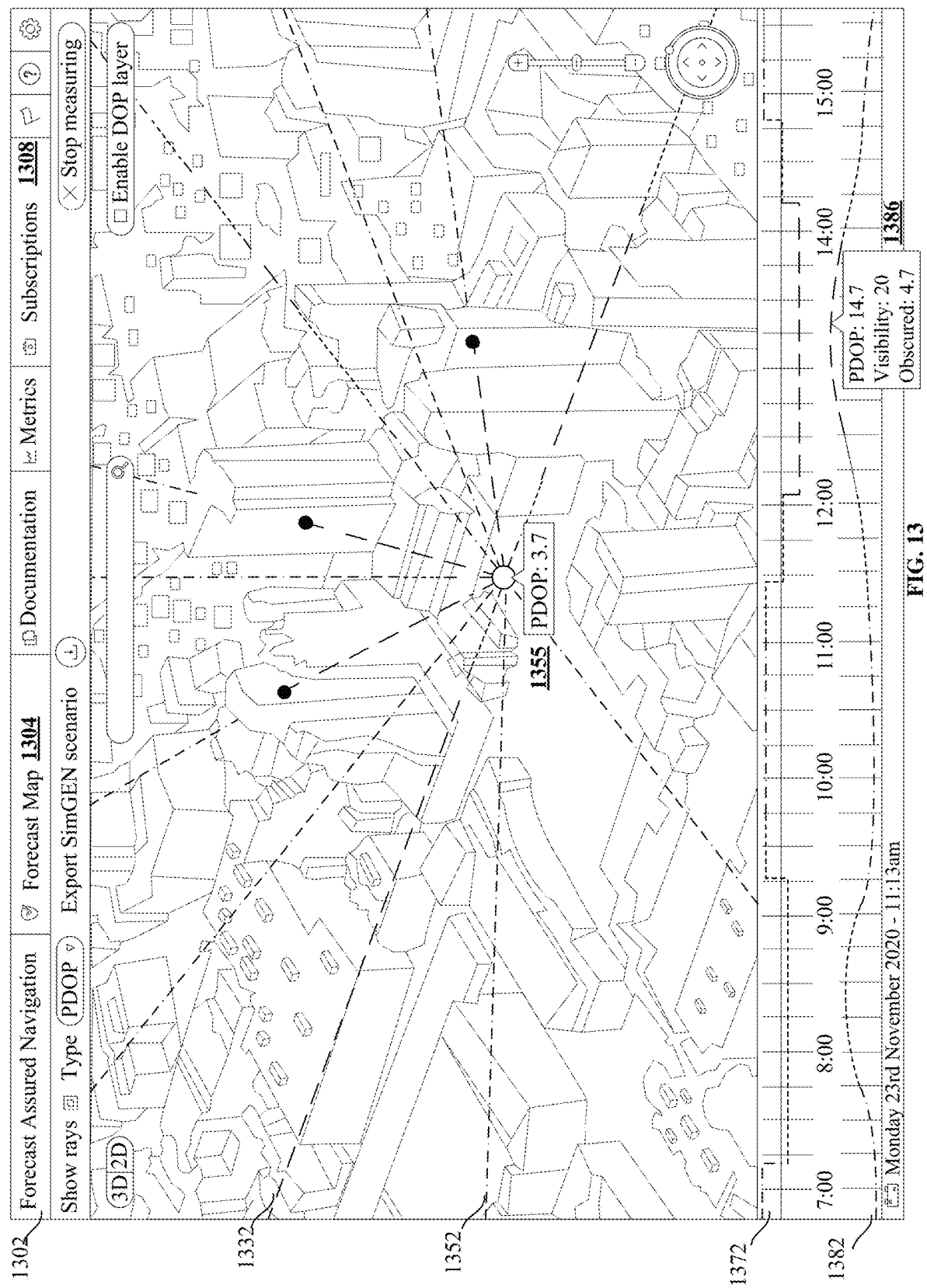
FIG. 13 illustrates one example of the disclosed Forecast Assured Navigation (FAN) user interface.

FIG. 13 illustrates one example of the disclosed Forecast Assured Navigation (FAN) user interface (UI). A browser-based UI operator's view of the system is driven by the FAN data retrieved from the scheduler curation service 364, map curation service (MCS) 384 and logging and event service (LES) 372. FAN UI 1302 shows a snapshot in time that illustrates where buildings occlude line of sight, via the lines that shift from dash-dash-dot lines that show LOS to long dash lines that show NLOS, with PDOP 3.7 at the receiver 1355. LOS satellite signals are depicted with lines such as 1352 and NLOS satellite signals are depicted using lines such as 1332. A signal coming from a satellite in the sky is depicted as LOS before the signal encounters a building that blocks the signal. The UI displays the shift to NLOS long dashes pattern between the building and the receiver 1355, as shown in FIG. 13. The disclosed FAN user interface 1302 also depicts a count of satellites that are visible over time. Satellite count 1372 is graphed over time. Color can be used to contrast higher counts of satellites visible against fewer visible satellites at other times, across the width of the timeline. FAN user interface 1302 further depicts a graph of DOP changes over time 1382 for the receiver, via the disclosed timeline visualization shown near the bottom of the UI. A point in time can also be selected to view the PDOP, visibility and obscuration 1386. Higher PDOP values can be distinguished from and lower PDOP values by a changing color or dash pattern of the trace line. The disclosed FAN UI can utilize a variety of graphs and patterns in another implementation. For example, forecast maps 1304 and forecast subscriptions 1308 can be accessed via UI 1302.

Users can access the forecast data via a visualization in a UX, and can change perspective, using rotate, pan and zoom features. A PDOP 2D layer displays the heatmap at a given altitude as a heatmap slice and users can utilize a slider on the UX to move the layer up and down in altitude. Additionally disclosed, users can view the data in 3D space using a PDOP 3D heat cloud that shows the heatmap in 3D, and the timeline can display the PDOP changing over time and illustrate how time impacts the heatmap.

In addition to PDOP, geometrical DOP, horizontal DOP, vertical DOP and time DOP can be computed and displayed in the forecast data, via the FAN UI. These values can be computed for a combination of satellite navigation systems, i.e., as a "multi-GNSS DOP", which refers to the combination of more than one satellite system. The values can alternatively be provided for each individual constellation, including GPS, GLONASS, Galileo and BeiDou, for example. In addition to DOP, other items which can be calculated and displayed include the number of visible LOS satellites and the number of not visible NLOS satellites. The level of multipath in an area can be estimated or mathematically analyzed, including general level of multipath in an area, level of multipath on a multi-GNSS constellation basis, level of multipath on a per GNSS constellation basis, and level of multipath on a per satellite basis. Predicted position errors and relative predicted position errors can also be calculated and displayed. As well as computing the values, the display of these can also be altered. For example, each value, or type of value can use its own, individual color palette and way of display. This can be automated, or manually chosen. The display elements can be context sensitive, depending upon the type of question that is being asked in the request. The displayed items can be focused to respond to particular issues, such as worst area, best area, relative performance spatially in 2D, vertically in 3D, and temporally to show changes over time.

GNSS Forecast can be utilized to predict where and when satellite navigation meets the technical requirements for a specific use case. In one example, real-time integrity improvement of a navigation sub-system is achieved via real-time use of the GNSS Forecast to look approximately 1 KM ahead of the vehicle to determine what GNSS is available, what precision is possible, if mitigation is sufficient, and what level of autonomy can be maintained. Then, if needed, the system can change autonomous mode or provide additional time for disengagement to the driver.

Figure 14:
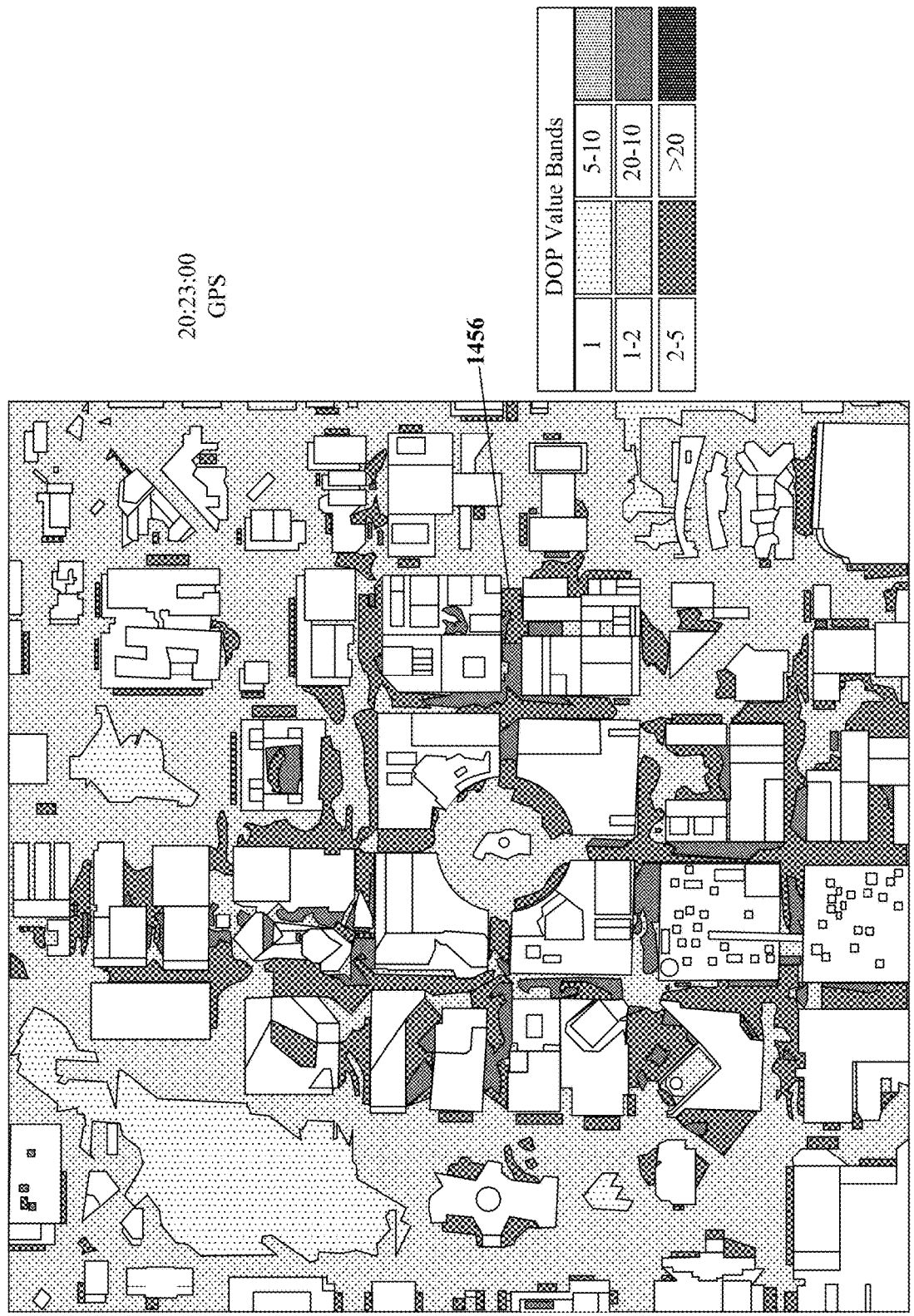
FIG. 14, FIG. 15 and FIG. 16 illustrate GNSS Forecast visualizations at three sequential times, separated by 12 minutes each.
Figure 15:
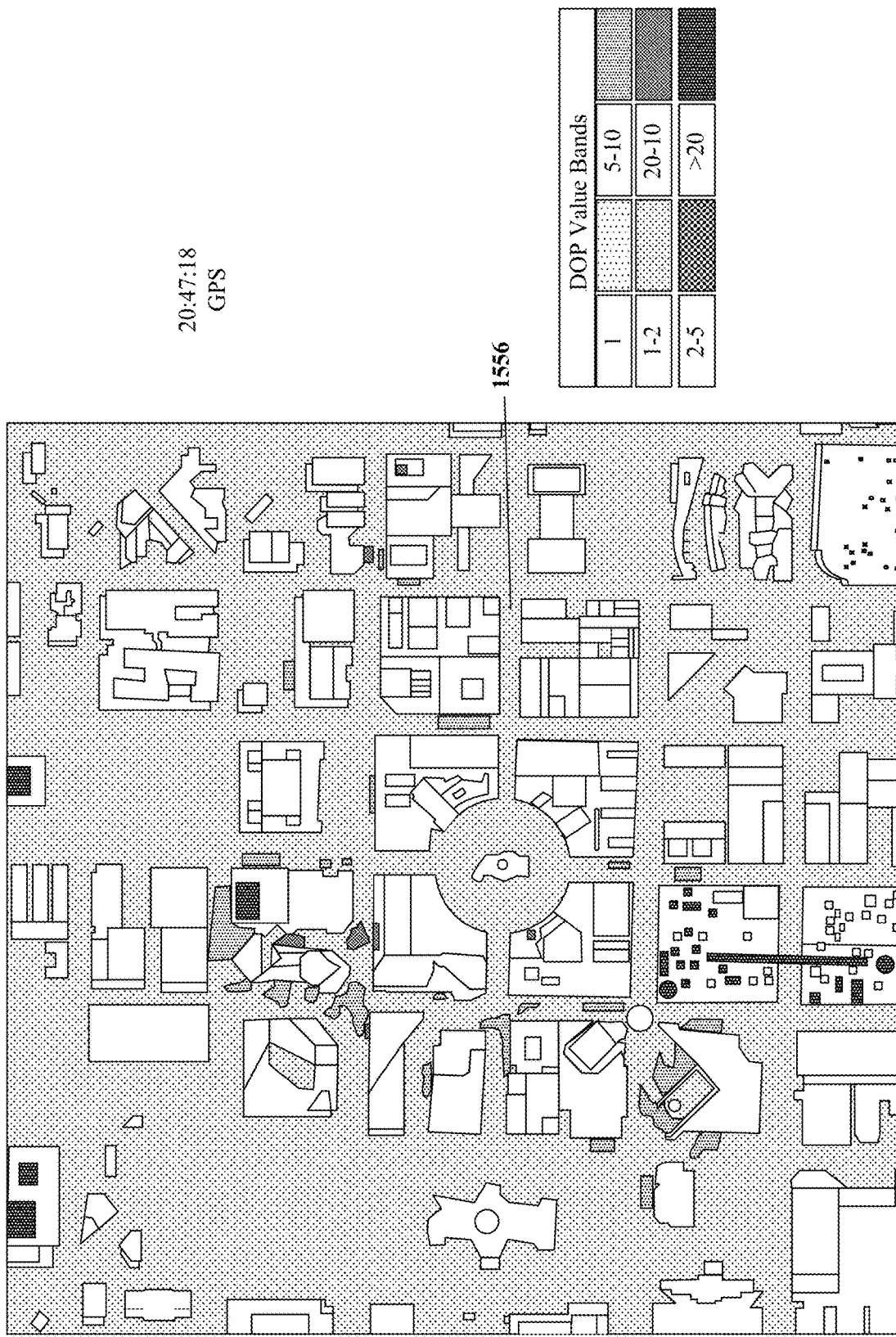
Figure 16:
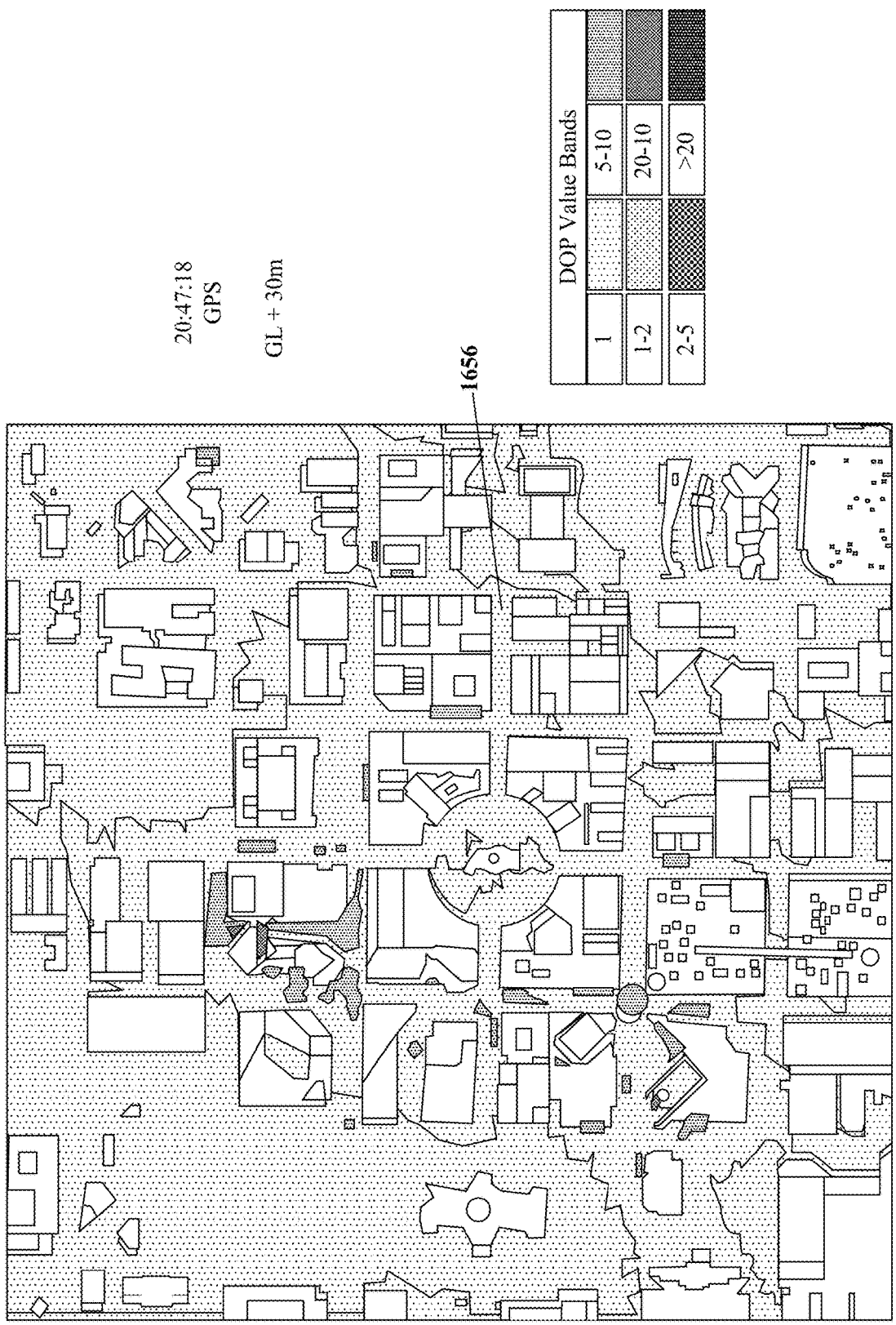

FIG. 14, FIG. 15 and FIG. 16 illustrate a GNSS Forecast visualization for multiple instances of a 1 km×1 km grid selected to cover the center of the city of Indianapolis, at different sample times, and at multiple elevations. Six shadings encode six different DOP value bands in the visualizations.

FIG. 14 displays the GNSS Forecast at 20:23:00 GPS at ground level. Note that navigation in the city center 1456 is impacted, as illustrated by the high DOP values.

FIG. 15 displays the GNSS Forecast at 20:47:18 GPS at ground level. Note that navigation in the city center is less impacted only 24 minutes later, as illustrated by the lower DOP values shown in the visualization in the city center 1556.

FIG. 16 displays the GNSS Forecast at 20:47:18 GPS at 30 meters above ground level. Note that the graph of DOP value bands shows low DOP values in the downtown area 1656, which is accessible at the height of 30 meters above ground level.

GNSS Forecast maps show GNSS receiver calculation position compared to GNSS actual position. For multi-constellation receiver and forecast (with RTK) tests performed with the disclosed GPU-based system using commercial 3D mapping, initial performance results show 94-98 percent correlation with real world measurements. GNSS performance bands show distinctions between ideal, excellent, ok, moderate, poor and bad environments. Forecast predictions match real world performance, with poor and bad predictions corresponding to poor and bad positioning accuracy. The Forecast Assured Navigation (FAN) Forecast can be utilized for accurate prediction of GNSS-degraded environments.

Figure 17:
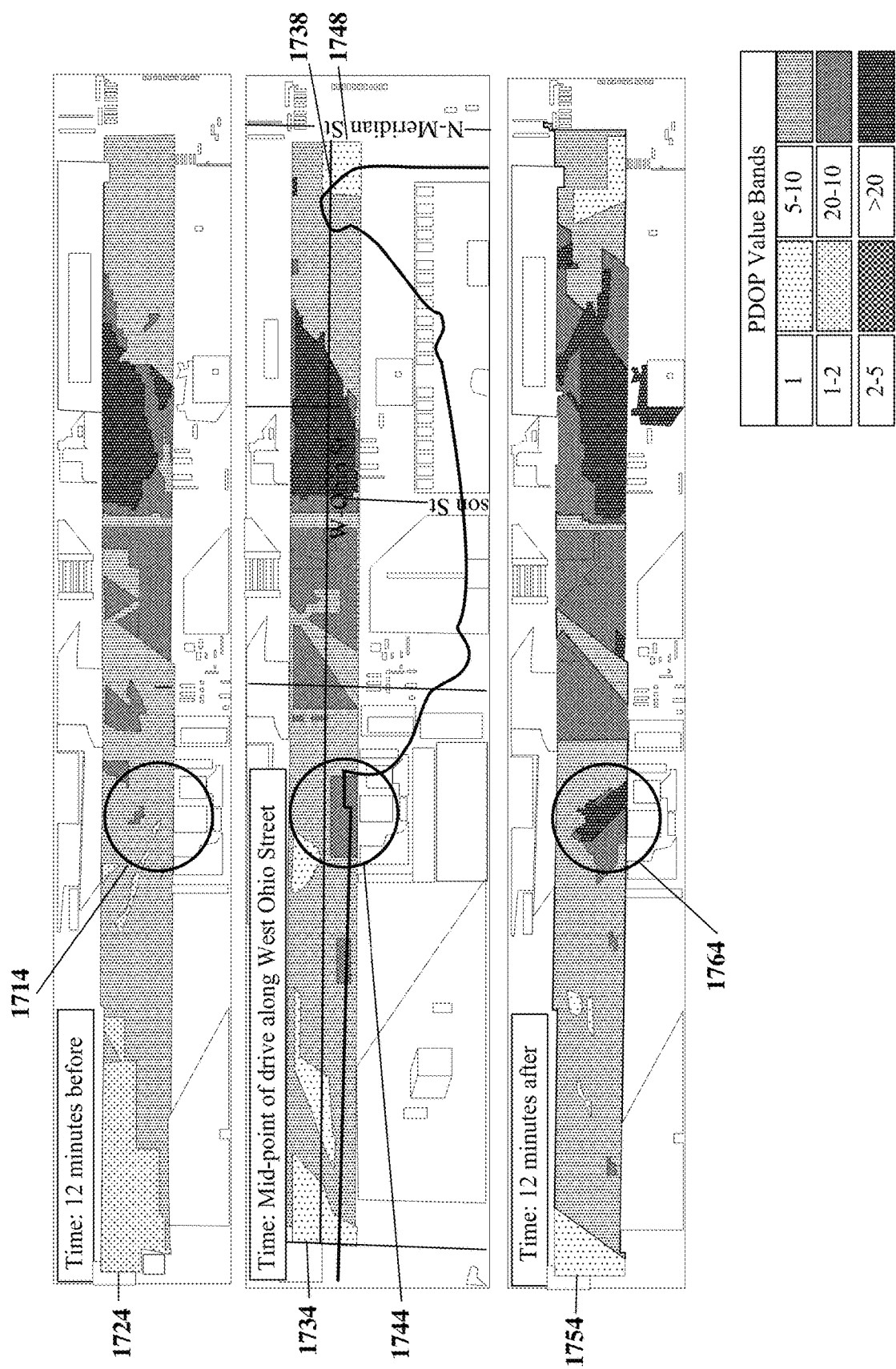
FIG. 17 depicts a route along West Ohio Street in the urban center of Indianapolis that shows where the receiver thinks it is, at 12 minutes before the mid-point time of the drive, encoded with PDOP value bands.
Figure 18:
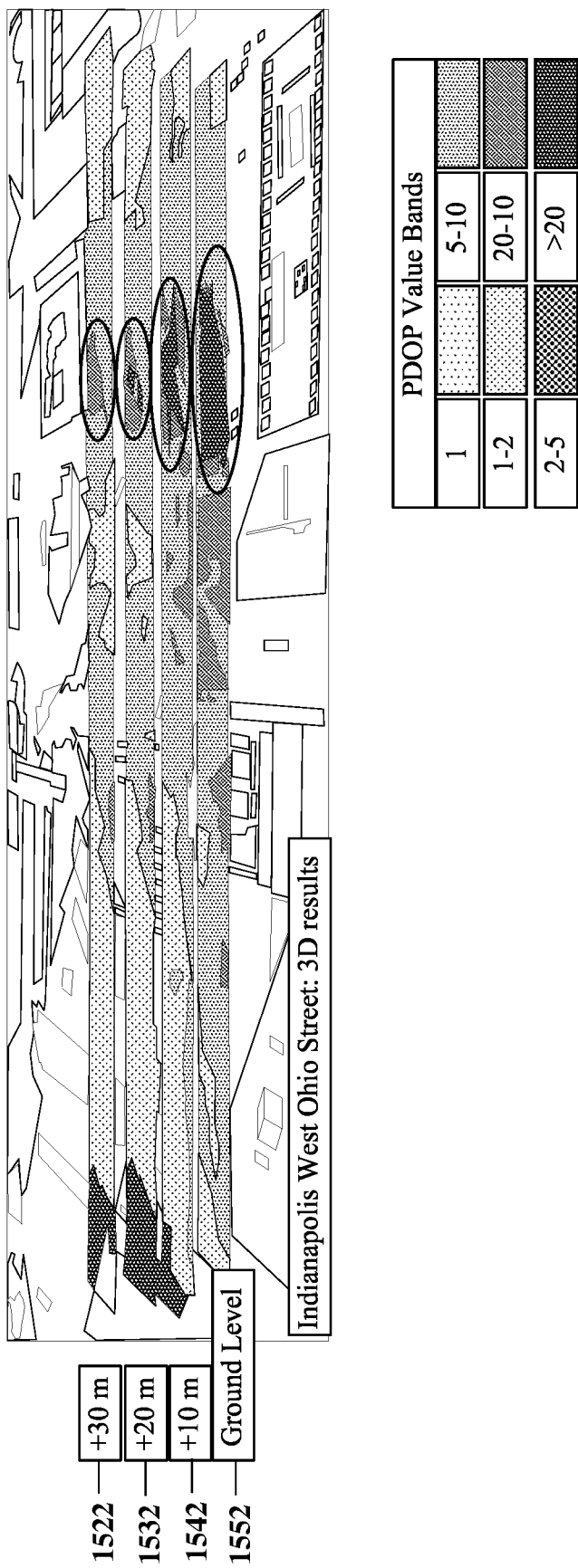
FIG. 18 depicts 3D GNSS Forecast visualization heat map results for West Ohio Street, Indianapolis, at four different altitude planes.

FIG. 17 and FIG. 18 illustrate GNSS Forecast visualizations at three sequential times, separated by 12 minutes each. FIG. 17 depicts a route along West Ohio Street in the urban center of Indianapolis that shows where the receiver thinks it is, at 12 minutes before the mid-point time of the drive 1724, encoded with PDOP value bands. A second depiction shows the route at the mid-point time of the drive 1734, and a third depiction shows the PDOP along same route 12 minutes later in time for the mid-point of the drive 1754 along West Ohio Street. Path 1738 is the route that the receiver actually travelled, straight from left to right along the route. The three circled areas 1717, 1744, 1764 of FIG. 17 illustrate the correlation between the prediction via PDOP values and the receiver's performance. The PDOP values predict the degradation of the receiver's signals. The receiver's performance recovers when the PDOP value bands return to lower values 1748 during the mid-point of the drive 1754 along West Ohio Street. Disclosed FAN forecast predictions enable avoidance of pitfalls, by planning a different route, time, or altitude. The best route in/out of the area can be evaluated. Route issues can be mitigated, using the predictions to determine whether the user can operate without GNSS and for what time period.

FIG. 18 depicts 3D GNSS Forecast visualization results for West Ohio Street, Indianapolis, at four different altitude planes. The heat maps for ground level 1852, +10 m 1842, +20 m 1832 and +30 m 1822 show the relative PDOP graphs for those four altitudes. The area with high PDOP value band is larger at ground level and gets smaller as the altitude increases. This supports the expectation of a lower DOP and a resulting higher accuracy of signal when the altitude rises above the level of the buildings in the urban landscape.

In one implementation, with floating planes of signal strength, a disclosed method of visualizing GNSS coverage over time for route planning, includes providing for display an interface that accepts input, receiving the input specifying at least one corridor through an urban area being traversed and visualization parameters, including elevation slices and a time range, and in some cases a flight plan through the corridor and satellite constellation(s), to depict. The method also includes accessing a 3D map of the urban area, including structure solids that block lines of sight between cuboids on the elevation slices along the corridor and satellites overhead, wherein the elevation slices are bounded planes in space between the structure solids and are parallel to a surface of the 3D map, and computing a requested visualization over time, including ray casting or tracing between the cuboids and satellites over time to calculate line of sight visibility or dilution of precision at the point location over the time range. The method further includes initializing a 3D map visualization, overlaying the elevation slices on an orthogonal projection from a viewpoint above a lowest elevation slice and below a highest elevation slice, wherein each elevation slice translucently encodes the line-of-sight visibility or dilution of precision for the cuboids on the elevation slice. In some implementations, the method includes overlaying flight plan segments through the corridor on the orthogonal projection and visually encoding the segments to indicate the line-of-sight visibility or dilution of precision along the route segments. The method also includes combining the 3D map visualization with a scrubbing slider to control a departure or arrival time depicted, and in some cases overlaying the scrubbing slider control with an indication of line-of-sight visibility or dilution of precision over the flight plan through the corridor at times in a range spanned by the scrubbing slider. The method further includes providing for display the 3D map visualization combined with the scrubbing slider control, including the overlaid elevation slices.

For visualizing signal strength via translucent clouds, in one implementation a disclosed method of visualizing GNSS coverage over time for flight planning includes providing for display an interface that accepts input and receiving the input specifying at least one corridor through an urban area being traversed and visualization parameters, including an elevation range and a time range and in some cases a flight plan through the corridor and satellite constellation(s) to depict. The disclosed method also includes accessing a 3D map of the urban area, including structure solids that block lines of sight between cuboids in the elevation range along the corridor and satellites overhead, wherein the corridor and elevation range occupy space between the structure solids of the 3D map, and computing a requested visualization over time, including ray casting or tracing between the cuboids and satellites over time to calculate line of sight visibility or dilution of precision at the point location over the time range. The method further includes initializing a 3D map visualization overlaying a translucent cloud of values of points, of equal value surfaces on an orthogonal projection, wherein the values encode the line-of-sight visibility or dilution of precision for the cuboids in the translucent cloud. In some implementations, the method also includes overlaying flight plan segments on the orthogonal projection and visually encoding the segments to indicate the line-of-sight visibility or dilution of precision along the flight plan segments. The disclosed method also includes combining the 3D map visualization with a scrubbing slider to control a departure or arrival time depicted and can include overlaying the scrubbing slider control with an indication of line-of-sight visibility or dilution of precision over a route through the translucent cloud at times in a range spanned by the scrubbing slider. The method further includes providing for display the 3D map visualization combined with the scrubbing slider control, including the overlaid elevation slices.

In an additional use case, an API view enables users to visualize GNSS Forecast data requested and received using the APIs. The developer can move the reticule around and view a dynamically updated display of the results of example API calls. Developers can also adjust API time window values via controls on the timeline and can view a live response from the APIs to help debug calls to the APIs.

Some Particular Implementations

We describe some particular implementations and features usable for providing best- and worse-case risk analysis, usable for routing drones.

In one implementation of a disclosed method of routing an autonomous drone using GNSS data by using a worst-case of risk analyses for planning including obtaining from a risk analysis server a worst-case risk analysis responsive to a requested range of time, wherein the worst-case risk analysis identifies cuboids in an area through which a drone can fly throughout at least the requested range of time with configurably adequate GNSS coverage for autonomous flight guidance. The method also includes identifying, by a first routing algorithm, a route through the cuboids identified as having the adequate GNSS coverage, from a starting location to a destination.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

For some implementations, the disclosed method further includes routing the autonomous drone over the identified route. The configurably adequate GNSS coverage can be defined by a target precision percentage. The target precision percentage can be at least 95, 98, 99, 99.9 percent or in a range between any two of these percentages.

The configurably adequate GNSS coverage can be based on whether the area is urban, suburban, or rural.

Adequate GNSS coverage can be GNSS coverage that satisfies requirements of an administrative agency. The administrative agency can be the Federal Aviation Administration (FAA) or any other branch of the Department of Transportation (DOT).

For some uses, worst-case analysis does not reveal an always-available path from a starting location to a destination, so best-case risk analysis also is used to plan a route with adequate coverage. Another method implementation provides for routing an autonomous drone using GNSS data by using a worst-case and then a best-case pair of risk analyses for planning, including obtaining from a risk analysis server a worst-case risk analysis responsive to a requested range of time that identifies first cuboids in an area through which a drone can fly throughout at least the requested range of time with configurably adequate GNSS coverage for autonomous flight guidance. Using the worst-case analysis, attempting but failing to identify, by a first routing algorithm, a route through the first cuboids identified as having the adequate GNSS coverage, from a starting location to a destination. The method progresses to obtaining a best-case risk analysis responsive to the requested range of time that identifies second cuboids in an area and accompanying times during which the drone can fly through the second cuboids with the configurably adequate GNSS coverage for autonomous flight guidance. Using that risk analysis, identifying, by a second routing algorithm, a time-dependent route between the starting location and the destination.

As above, one or more of the following features can be used with this and other implementations. The method can further include routing a vehicle over the time-dependent route during the requested range of time from the starting location to destination.

The method can be supplemented by obtaining supplemental time-dependent forecast data that: includes the start location and the destination of the autonomous vehicle, and predicts a subrange of time that the time-dependent route satisfies a configurably adequacy of GNSS coverage over time for third cuboids along at least one route from the start location to the destination. Then, The method can extend to routing the drone using supplemental time-dependent forecast data.

Routing that combines worst- and best-case risk analysis and alternatively be implemented by a method of routing an autonomous drone using GNSS data by using a worst-case and then a best-case pair of risk analyses for planning, including obtaining from a risk analysis server a worst-case risk analysis responsive to a requested range of time that identifies first cuboids in an area through which a drone can fly throughout at least the requested range of time with configurably adequate GNSS coverage for autonomous flight guidance. Then, attempting but failing to plan a route through the first cuboids identified as having the adequate GNSS coverage, from a starting location to a destination. The method proceeds to obtaining a best-case risk analysis responsive to the requested range of time that identifies second cuboids in an area during which the drone can fly through the second cuboids with the configurably adequate GNSS coverage for autonomous flight guidance. Then, verifying, using the best-case risk analysis, that a likely route can be planned from the starting location to the destination through the second cuboids that have the configurably adequate GNSS coverage for a period within the range of time. The method further includes requesting and receiving a forecast for at least the requested range of time covering at least the likely route. Ultimately, finding in the forecast data at least one time during which the drone can fly from the starting location to the destination through the second cuboids that have the configurably adequate GNSS coverage for a period within the range of time.

The technology for that can be implemented as a tangible non-transitory computer readable storage medium loaded with computer program instructions that, when executed on processors, cause the processors to implement the methods described above.

A system implementation and other systems disclosed optionally include one or more computing devices with processors, memory coupled to the processors and computer instructions from the non-transitory computer readable storage medium. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

Ultimately, the technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options.

The technology disclosures also can be viewed from the perspective of a risk-plot generator. One implementation is a method of generating and distributing GNSS data for facilitating safe routing of autonomous drones, including obtaining three to fifty days of historical GNSS satellite path data, at least two of which are non-consecutive days, for a region of calculation With this data, calculating or generating, using the historical GNSS satellite path data, a worst-case risk analysis for the region of calculation that reveals cuboids in the region of interest through which a drone can fly through with configurably adequate GNSS coverage for autonomous flight irrespective of the time of flight. Calculating or generating can include sampling, over a range of hours of historical GNSS satellite path data, using a three-dimension model of the region of calculation and ray casting from the cuboids to the historical paths of the GNSS satellites using the three-dimensional model to determine precision of GNSS coverage for cuboids. For each cuboid in the region of calculation, this includes determining the lowest precision of GNSS coverage during the consecutive span of hours. the generator system receives and responds to a request for the worst-case risk analysis for a requested region of interest within the region of calculation by distributing the worst-case risk analysis. Request also can include a time range. However, risk analysis are valid for enough time data time parameter could practically be omitted.

As above, this method and other implementations of the technology disclosed can include one or more of the following features. The worst-case analysis can include indications of the cuboids in the requested area for which adequate GNSS coverage is not dependent on time-of-day. That is, cuboids that always have adequate coverage.

Configurably adequate coverage can be coverage that satisfies requirements of an administrative agency, such as the FAA or another branch of DOT. The historical GNSS satellite path data can include three to ten non-consecutive days. The non-consecutive days Can be separated by 5 to 20 days. For the raycasting, the sampling of coverage adequacy can be conducted on an interval between once per half-second and once per 90 seconds. The range of hours of historical GNSS satellite path data for any of the days can be between 12 to 24 hours.

In general, ray casting determines whether there is a Line of Sight (LOS) between cuboids and satellites. It also can determine whether there is dilution of precision, for instance, at the edge of buildings.

The technology disclosed includes calculation of appropriate buffer zones and application of the buffer zones to areas calculated to have inadequate coverage. any of the methods above can be extended, wherein the worst-case risk analysis includes inadequate coverage zones, and the generating further includes padding worst zones with a buffer zone that extends outward from the inadequate coverage zones up to 3 meters. The extension of the buffer zone can be smaller, such as two meters or ½ meter. It can be larger, such as five or seven meters. It can be in a range between any two of these values.

When the worst-case analysis needs to be accompanied by a best-case risk analysis, the risk analysis server can further generate, using the historical satellite data, a best-case risk analysis for the region of interest that reveals cuboids in which, for at least a period of time in the historical GNSS satellite path data, a time-sensitive route is available. It can receive and respond to a request for the best-case analysis for a second requested range of time and the region of interest by distributing the best-case risk analysis.

The analysis can be further extended using forecast data. This includes receiving and responding to a request for a forecast for at least the requested range of time covering at least the likely route. The forecast covers an area including the starting location to the destination. It provides adequacy of coverage data, such as line of sight or dilution of precision, for cuboids the requested area between the start and destination.

Again, any of the technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A method of generating and distributing GNSS data for facilitating safe routing of autonomous drones, the method including:
    obtaining three to fifty days of historical GNSS satellite path data, at least two of which are non-consecutive days, for a region of calculation;
    generating, using the historical GNSS satellite path data, a worst-case risk analysis for the region of calculation that reveals cuboids in the region of interest through which a drone can fly through with configurably adequate GNSS coverage for autonomous flight irrespective of the time of flight, including:
        sampling, over a range of hours of historical GNSS satellite path data, using a three-dimension model of the region of calculation, including ray casting from the cuboids to the historical paths of the GNSS satellites using the three-dimensional model to determine precision of GNSS coverage for cuboids; and
        for each cuboid in the region of calculation, determining the lowest precision of GNSS coverage during the consecutive span of hours;
    receiving and responding to a request for the worst-case risk analysis for a region of interest within the region of calculation by distributing the worst-case risk analysis for the region of interest.

2. The method of claim 1, further including indicating in the worst-case analysis the cuboids for which adequate GNSS coverage is not dependent on time-of-day.

3. The method of 1, wherein configurably adequate is met when the precision of GNSS coverage satisfies requirements of a Federal Aviation Administration (FAA).

4. The method of claim 1, wherein the historical GNSS satellite path data includes three to ten non-consecutive days.

5. The method of claim 1, wherein the non-consecutive days are separated by 5 to 20 days.

6. The method of claim 1, wherein the sampling is conducted on an interval between once per half-second and once per 90 seconds.

7. The method of claim 1, wherein the range of hours of historical GNSS satellite path data is between 12 to 24 hours.

8. The method of claim 1, further including:
    wherein the worst-case risk analysis includes inadequate coverage zones; and
    wherein the generating further includes padding worst zones with a buffer zone that extends outward from the inadequate coverage zones up to 10 meters.

9. The method of claim 8, wherein the buffer zone extends outward up to 5 meters.

10. The method of claim 8, further including:
    generating, using the historical satellite data, a best-case risk analysis for the region of calculation that reveals cuboids in which, for at least a period of time in the historical GNSS satellite path data, a time-sensitive route is available; and
    receiving a request for the best-case analysis for the region of interest and responding by distributing the best-case risk analysis.

11. The method of claim 10, further including:
    requesting and receiving a forecast for at least the requested range of time covering at least the likely route; and finding in the forecast at least one time during which the drone can fly from the starting location to the destination through the cuboids that have the configurably adequate GNSS coverage for a period within the range of time.

12. A non-transitory computer readable medium impressed with computer program instructions that, when executed on hardware, cause the hardware to carry out actions of generating and distributing GNSS data for facilitating safe routing of autonomous drones, the actions including:
obtaining three to fifty days of historical GNSS satellite path data, at least two of which are non-consecutive days, for a region of calculation;
generating, using the historical GNSS satellite path data, a worst-case risk analysis for the region of calculation that reveals cuboids in the region of interest through which a drone can fly through with configurably adequate GNSS coverage for autonomous flight irrespective of the time of flight, including:
sampling, over a range of hours of historical GNSS satellite path data, using a three-dimension model of the region of calculation, including ray casting from the cuboids to the historical paths of the GNSS satellites using the three-dimensional model to determine precision of GNSS coverage for cuboids; and
for each cuboid in the region of calculation, determining the lowest precision of GNSS coverage during the consecutive span of hours;
receiving and responding to a request for the worst-case risk analysis for a region of interest within the region of calculation by distributing the worst-case risk analysis for the region of interest.

13. The computer readable medium of 12, wherein configurably adequate is met when the precision of GNSS coverage satisfies requirements of a Federal Aviation Administration (FAA).

14. The computer readable medium of claim 12, wherein the historical GNSS satellite path data includes three to ten non-consecutive days.

15. The computer readable medium of claim 12, wherein the non-consecutive days are separated by 5 to 20 days.

16. The computer readable medium of claim 12, further including:
wherein the worst-case risk analysis includes inadequate coverage zones; and
wherein the generating further includes padding worst zones with a buffer zone that extends outward from the inadequate coverage zones up to 10 meters.

17. The computer readable medium of claim 16, wherein the buffer zone extends outward up to 5 meters.

18. The computer readable medium of claim 16, further including:
generating, using the historical satellite data, a best-case risk analysis for the region of calculation that reveals cuboids in which, for at least a period of time in the historical GNSS satellite path data, a time-sensitive route is available; and
receiving a request for the best-case analysis for a second requested range of time and the region of interest and responding by distributing the best-case risk analysis.

19. The computer readable medium of claim 18, further including:
requesting and receiving a forecast for at least the requested range of time covering at least the likely route; and
finding in the forecast at least one time during which the drone can fly from the starting location to the destination through the cuboids that have the configurably adequate GNSS coverage for a period within the range of time.

20. A system including hardware and a non-transitory computer readable medium impressed with computer program instructions that, when executed on the hardware, cause the hardware to carry out actions of generating and distributing GNSS data for facilitating safe routing of autonomous drones, the actions including:
obtaining three to fifty days of historical GNSS satellite path data, at least two of which are non-consecutive days, for a region of calculation;
generating, using the historical GNSS satellite path data, a worst-case risk analysis for the region of calculation that reveals cuboids in the region of interest through which a drone can fly through with configurably adequate GNSS coverage for autonomous flight irrespective of the time of flight, including:
sampling, over a range of hours of historical GNSS satellite path data, using a three-dimension model of the region of calculation, including ray casting from the cuboids to the historical paths of the GNSS satellites using the three-dimensional model to determine precision of GNSS coverage for cuboids; and
for each cuboid in the region of calculation, determining the lowest precision of GNSS coverage during the consecutive span of hours;
receiving and responding to a request for the worst-case risk analysis for a region of interest within the region of calculation by distributing the worst-case risk analysis for the region of interest.

21. The computer readable medium of claim 20, further including:
wherein the worst-case risk analysis includes inadequate coverage zones; and
wherein the generating further includes padding worst zones with a buffer zone that extends outward from the inadequate coverage zones up to 10 meters.

22. The computer readable medium of claim 21, wherein the buffer zone extends outward up to 5 meters.

23. The computer readable medium of claim 21, further including:
generating, using the historical satellite data, a best-case risk analysis for the region of calculation that reveals cuboids in which, for at least a period of time in the historical GNSS satellite path data, a time-sensitive route is available; and
receiving a request for the best-case analysis for a second requested range of time and the region of interest and responding by distributing the best-case risk analysis.

24. The computer readable medium of claim 23, further including:
requesting and receiving a forecast for at least the requested range of time covering at least the likely route; and
finding in the forecast at least one time during which the drone can fly from the starting location to the destination through the cuboids that have the configurably adequate GNSS coverage for a period within the range of time.

* * * * *